United States Patent
Gibson et al.

(10) Patent No.: US 9,953,275 B2
(45) Date of Patent: *Apr. 24, 2018

(54) SYSTEM AND METHODS FOR THIRD-PARTY ACCESS TO A NETWORK-BASED SYSTEM FOR PROVIDING LOCATION-BASED UPCOMING EVENT INFORMATION

(71) Applicant: PAYPAL, INC., San Jose, CA (US)

(72) Inventors: Ashley Gibson, Pacifica, CA (US); Cass Patrick Costello, Albany, CA (US); Conny C. Wu, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,857

(22) Filed: Apr. 15, 2016

(65) Prior Publication Data

US 2016/0232460 A1 Aug. 11, 2016

Related U.S. Application Data

(63) Continuation of application No. 14/188,620, filed on Feb. 24, 2014, now Pat. No. 9,330,364, which is a (Continued)

(51) Int. Cl.
*G06F 7/00* (2006.01)
*G06F 17/30* (2006.01)
(Continued)

(52) U.S. Cl.
CPC ......... *G06Q 10/02* (2013.01); *G06F 17/3087* (2013.01); *G06F 17/30864* (2013.01);
(Continued)

(58) Field of Classification Search
CPC ......... G06F 17/30991; G06F 17/30994; G06F 17/30864; G06F 17/3087; G06F 17/30979; G06Q 10/02; G06Q 30/06
See application file for complete search history.

(56) References Cited

U.S. PATENT DOCUMENTS

| 5,408,417 A | 4/1995 | Wilder |
| 5,797,126 A | 8/1998 | Helbling et al. |

(Continued)

FOREIGN PATENT DOCUMENTS

WO   WO 0225557   3/2002

OTHER PUBLICATIONS https://www.seats3d.com/.
(Continued)

*Primary Examiner* — Kannan Shanmugasundaram
(74) *Attorney, Agent, or Firm* — Haynes & Boone, LLP

(57) ABSTRACT

A system and methods for third-party access to a network-based system for providing location-based upcoming event information are described. The location-based upcoming event information may be accessed from the network-based system by a server-side web application implemented by a third party. The server-side web application may be configured to communicate with the network-based system that provides online marketplace and ticket fulfillment services and to generate a query based upon the location of a user and other event criteria. The server-side web application may communicate the query to the network-based system and, in response, receive location-based upcoming event information which may be displayed to a user as a list and/or information on a map. The location-based upcoming event information may comprise an aggregate of ticket inventory available from multiple online marketplaces providing the user with multiple purchasing options.

17 Claims, 4 Drawing Sheets

Related U.S. Application Data continuation of application No. 12/338,158, filed on Dec. 18, 2008, now Pat. No. 8,661,025, which is a continuation-in-part of application No. 12/275,783, filed on Nov. 21, 2008, now Pat. No. 8,732,007, said application No. 14/188,620 is a continuation of application No. 12/262,468, filed on Oct. 31, 2008, now Pat. No. 8,731,526, which is a continuation of application No. 11/552,782, filed on Oct. 25, 2006, now Pat. No. 7,917,398.

(51) Int. Cl.
  *G06Q 10/02* (2012.01)
  *G06Q 30/06* (2012.01)
  *G06F 17/00* (2006.01)

(52) U.S. Cl.
  CPC .. *G06F 17/30979* (2013.01); *G06F 17/30991* (2013.01); *G06F 17/30994* (2013.01); *G06Q 30/06* (2013.01)

(56) References Cited

U.S. PATENT DOCUMENTS

| | | | |
|---|---|---|---|
| 5,948,040 | A | 9/1999 | Delorme et al. |
| 6,023,685 | A | 2/2000 | Brett et al. |
| 6,107,932 | A | 8/2000 | Walker et al. |
| 6,223,166 | B1 | 4/2001 | Kay |
| 6,240,396 | B1 | 5/2001 | Walker et al. |
| 6,446,004 | B1 | 9/2002 | Cao et al. |
| 6,457,046 | B1 | 9/2002 | Munakata |
| 6,650,998 | B1 | 11/2003 | Rutledge et al. |
| 6,704,713 | B1 | 3/2004 | Brett |
| 6,907,405 | B2 | 6/2005 | Brett |
| 6,999,936 | B2 | 2/2006 | Sehr |
| 7,003,485 | B1 | 2/2006 | Young |
| 7,044,362 | B2 | 5/2006 | Yu |
| 7,071,842 | B1 | 7/2006 | Brady, Jr. |
| 7,454,361 | B1 | 11/2008 | Halavais et al. |
| 7,506,805 | B1 | 3/2009 | Chakravarthy |
| 7,584,123 | B1 | 9/2009 | Karonis et al. |
| 2002/0052758 | A1 | 5/2002 | Arthur et al. |
| 2002/0055351 | A1 | 5/2002 | Elsey et al. |
| 2002/0082879 | A1 | 6/2002 | Miller et al. |
| 2002/0099562 | A1 | 7/2002 | Bruce, Sr. et al. |
| 2002/0116121 | A1 | 8/2002 | Ruiz et al. |
| 2002/0147656 | A1 | 10/2002 | Tam et al. |
| 2002/0161756 | A1 | 10/2002 | Fesq et al. |
| 2003/0046119 | A1 | 3/2003 | Yamamoto |
| 2003/0061147 | A1 | 3/2003 | Fluhr et al. |
| 2003/0066883 | A1 | 4/2003 | Yu |
| 2003/0069763 | A1 | 4/2003 | Gathman et al. |
| 2003/0115288 | A1 | 6/2003 | Ljubicich et al. |
| 2003/0164400 | A1 | 9/2003 | Boyd |
| 2003/0195803 | A1* | 10/2003 | Ketonen ............ G06Q 10/10 705/14.39 |
| 2003/0233278 | A1 | 12/2003 | Marshall |
| 2003/0236736 | A1 | 12/2003 | Harmon et al. |
| 2004/0006497 | A1 | 1/2004 | Nestor et al. |
| 2004/0039696 | A1 | 2/2004 | Harmon et al. |
| 2004/0093302 | A1* | 5/2004 | Baker .................. G06Q 30/06 705/37 |
| 2004/0153374 | A1 | 8/2004 | Nelson |
| 2004/0181572 | A1 | 9/2004 | Lee et al. |
| 2004/0193369 | A1 | 9/2004 | Kokojima et al. |
| 2005/0010591 | A1* | 1/2005 | Beaulieu ............ G06F 17/30398 |
| 2005/0027705 | A1* | 2/2005 | Sadri ................. G06F 17/30994 707/999.005 |
| 2005/0033615 | A1 | 2/2005 | Nguyen et al. |
| 2005/0074112 | A1 | 4/2005 | Timmins |
| 2005/0096960 | A1 | 5/2005 | Plutowski et al. |
| 2005/0131659 | A1 | 6/2005 | Mei et al. |
| 2005/0144115 | A1 | 6/2005 | Brett |
| 2005/0165762 | A1 | 7/2005 | Bishop |
| 2005/0246281 | A1 | 11/2005 | Gakuhari et al. |
| 2006/0081704 | A1 | 4/2006 | Boyd |
| 2006/0143094 | A1 | 6/2006 | Kohout et al. |
| 2007/0027794 | A1 | 2/2007 | Brett |
| 2007/0027798 | A1 | 2/2007 | Brett |
| 2007/0033131 | A1 | 2/2007 | Brett |
| 2007/0038582 | A1 | 2/2007 | Brett |
| 2007/0055554 | A1 | 3/2007 | Sussman et al. |
| 2007/0060108 | A1 | 3/2007 | East et al. |
| 2007/0156435 | A1 | 7/2007 | Greening et al. |
| 2007/0233708 | A1 | 10/2007 | Baio et al. |
| 2007/0233736 | A1* | 10/2007 | Xiong .................... G06Q 30/02 707/999.107 |
| 2007/0250775 | A1 | 10/2007 | Marsico et al. |
| 2007/0260636 | A1* | 11/2007 | Baio ................. G06F 17/30902 707/999.107 |
| 2007/0265892 | A1* | 11/2007 | Valentino ............... G06Q 10/02 705/5 |
| 2007/0282959 | A1 | 12/2007 | Stern |
| 2008/0162211 | A1 | 7/2008 | Addington |
| 2008/0229225 | A1 | 9/2008 | Kaye |
| 2008/0255889 | A1 | 10/2008 | Geisler et al. |
| 2008/0281644 | A1 | 11/2008 | Payne |
| 2008/0300925 | A1 | 12/2008 | Benson et al. |
| 2009/0030748 | A1 | 1/2009 | Halavais et al. |
| 2009/0063206 | A1 | 3/2009 | Payne et al. |
| 2009/0083085 | A1 | 3/2009 | Halavais et al. |

OTHER PUBLICATIONS http://www.seats.com/.
http://www.tickco.com/.
http:llwww.tickets4u.com/.
http://www.ticketsnow.com/.
Ticketsnow, TicketsNow Interactive Seating Charts Help Fans Find and Buy World Series Tickets, PR Newswire, Oct. 19, 2006.

* cited by examiner

Name of Application

Where are you or what location do you want to search?
Example: 123, Main Street San Francisco, CA 1 | Enter an Address or a City, State or Zip |—212

2  Category —214  Genre —216
   | Concerts ▼ |   | Jazz Music ▼ |

3  From —218  To —220
   | mm/dd/yyyy |   | mm/dd/yyyy |

( Search Events )—222

① Etta James at Yoshi's    01/13/2008

Featured Content

Tickets Available
StubHub! 12 Ticket Listings    $25-$125
ebay    18 Ticket Listings    $12-$270
kijiji    3 Ticket Listings    $50-$100

228
226
230

Results —224

Results 1-10 of about 21 for Jazz
Concerts near San Francisco, CA for
01/12/2008 to 01/22/2008

① Etta James at Yoshi's    01/13/2008
StubHub! 12 Ticket Listings    $25-$125
ebay    18 Ticket Listings    $12-$275
kijiji    3 Ticket Listings    $50-$100

② Herbie Hancock at    01/15/2008
Someplace
StubHub! 12 Ticket Listings    $25-$125
ebay    18 Ticket Listings    $12-$275
kijiji    3 Ticket Listings    $50-$100

③ Artist at Venue    Date
StubHub! 12 Ticket Listings    $25-$125
ebay    18 Ticket Listings    $12-$275
kijiji    3 Ticket Listings    $50-$100

④ Artist at Venue    Date
StubHub! 12 Ticket Listings    $25-$125
ebay    18 Ticket Listings    $12-$275
kijiji    3 Ticket Listings    $50-$100

210

SYSTEM AND METHODS FOR THIRD-PARTY ACCESS TO A NETWORK-BASED SYSTEM FOR PROVIDING LOCATION-BASED UPCOMING EVENT INFORMATION

RELATED APPLICATIONS

This application is a continuation of U.S. patent application Ser. No. 14/188,620, filed Feb. 24, 2014, which is a continuation of U.S. patent application Ser. No. 12/338,158, filed Dec. 18, 2008, now U.S. Pat. No. 8,661,025 which is a continuation-in-part of U.S. patent application Ser. No. 12/275,783, titled "System and Methods for Providing Location-Based Upcoming Event Information Using a Client-Side Web Application Implemented on a Client Device," which was filed on Nov. 21, 2008, now U.S. Pat. No. 8,732,007. U.S. patent application Ser. No. 14/188,620 also claims priority to U.S. patent application Ser. No. 12/262,468, titled "System and Methods for Upcoming Event Notification and Mobile Purchasing," which was filed on Oct. 31, 2008, now U.S. Pat. No. 8,731,526 and U.S. patent application Ser. No. 11/552,782, titled "Method and System for Illustrating Where a Ticket is Located in an Event Venue," which was filed on Oct. 25, 2006, now U.S. Pat. No. 7,917,398. These applications are entirely incorporated by reference.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell and distribute a wide variety of goods to take advantage of the many benefits provided by the Internet and electronic commerce.

One example of a market for goods within the realm of electronic commerce is the secondary ticket market. The secondary ticket market encompasses all instances in which live event tickets trade after the original point of purchase. This market exists for several reasons. First, event tickets have an especially time-sensitive nature. Numerous tickets expire unused each year because there is no efficient mechanism to buy and/or sell secondary event tickets. When a ticket expires after an event has passed, it loses all of its intrinsic value. As a result, if the ticket holder cannot attend the event, the only way to realize value for a ticket is to sell it in the secondary market. For example, many venues, universities and/or sports franchises offer "season tickets" which are often packaged in bulk requiring a buyer to purchase several tickets at once. As a result, season ticket holders often possess a number of tickets for events that they cannot attend, and therefore desire to sell on the secondary market.

Additionally, event venues have only a fixed supply of seating. Therefore, the number of available tickets for a particular event is limited, which means that high-demand events can have significant volumes of secondary trading. Buyers, who would like to sit only in certain seat locations, further create a supply and demand imbalance. Particularly, each seat location in a venue is totally unique, which means there could be demand for a specific seat location that exceeds supply even when the venue is not sold out in the primary market, thereby favoring the secondary market. Moreover, while tickets for certain events (e.g., football games of a team in the same venue) may be similarly priced, the actual supply and demand for such events may be substantially different, thereby favoring the secondary market.

StubHub provides a network-based system which implements an online secondary ticket marketplace for buyers and sellers of tickets for live events such as sports, concerts, theater, and other entertainment events. The StubHub online secondary ticket marketplace enables legitimate, convenient, reliable, and secure transactions at fair market value and provides ticket fulfillment services, even for "sold out" events. Accordingly, the StubHub online secondary ticket marketplace provides benefits for fans who wish to buy, sell or otherwise transfer secondary tickets as well as for teams, artists, and venues.

SUMMARY

Various embodiments relate to a system and methods for third-party access to a network-based system for providing location-based upcoming event information. The location-based upcoming event information may be accessed from the network-based system by a server-side web application implemented by a third party. The server-side web application may be configured to communicate with the network-based system that provides online marketplace and ticket fulfillment services and to generate a query based upon the location of a user and other event criteria. The server-side web application may communicate the query to the network-based system and, in response, receive location-based upcoming event information which may be displayed to the user as a list and/or information on a map. The location-based upcoming event information may comprise an aggregate of ticket inventory available from multiple online marketplaces providing the user with multiple purchasing options. Other embodiments are described and claimed.

BRIEF DESCRIPTION OF THE DRAWINGS

The foregoing aspects and many of the attendant advantages of various embodiments will become more readily appreciated and better understood by reference to the following detailed description and the accompanying drawings.

FIG. 2 illustrates a representation of a user interface presenting a third-party web page comprising a server-side web application user interface for accessing the network-based system and providing location-based upcoming event information in accordance with various embodiments.

FIG. 3 illustrates a representation of a server-side web application user interface for accessing the network-based system and providing location-based upcoming event information in accordance with various embodiments.

DETAILED DESCRIPTION

Various embodiments are described for providing access to an online ticket marketplace implemented by a network-based system to provide location-based upcoming event information. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
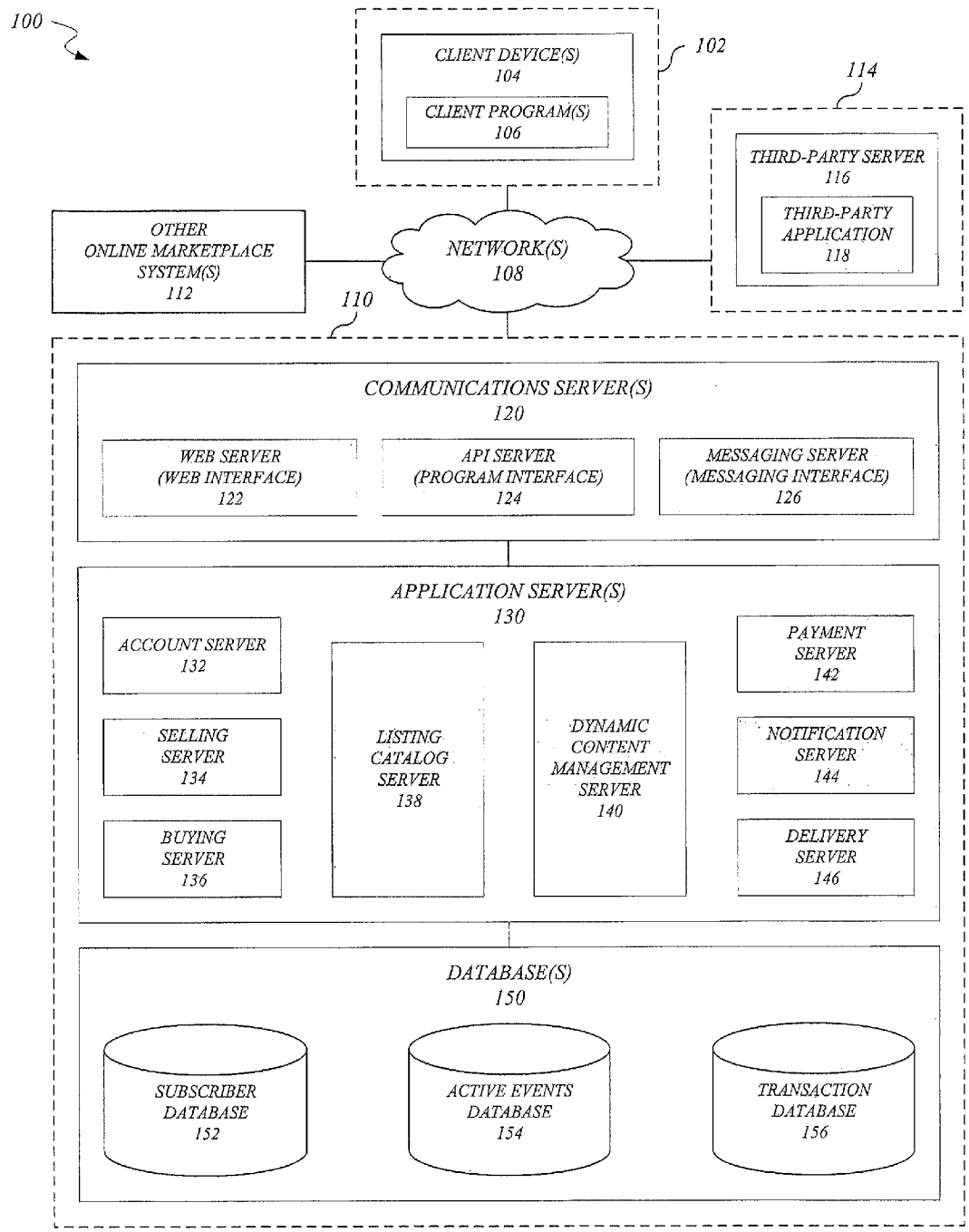
FIG. 1 illustrates an exemplary communications system including a network-based system for providing online marketplace and ticket fulfillment services in accordance with various embodiments.

FIG. 1 illustrates a communications system 100 suitable for implementing various embodiments. The elements of the communications system 100 generally may comprise physical or logical entities for communicating information and, in some cases, may be implemented as hardware, software, or combination thereof, as desired for a given set of design parameters or performance constraints. Although FIG. 1 includes a limited number of elements for purposes of illustration, it can be appreciated that the communications system 100 may include more or less elements as well as other types of elements.

Various elements of the communications system 100 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the communications system 100 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of the communications system 100 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of the communications system 100 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1×RTT, GSM/GPRS, EDGE, HSDPA, HSUPA, and others.

Computing devices and networks may support wireless local area network (WLAN) and/or wireless metropolitan are network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electro-magnetic induction (EMI) communication, passive or active RFID communication, micro-impulse radar (MIR), ultra-wide band (UWB) communication, automatic identification and data capture (AIDC) communication, and others.

Further aspects and advantages of various embodiments will become more readily appreciated and better understood by the following description of the elements of the communications system 100 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the communications system 100 includes, among other elements, a client 102 which may comprise or employ one or more client devices 104 such as a mobile computing device, a PC, and/or any other computing device having computing and/or communications capabilities in accordance with the described embodiments. The client devices 104 generally may provide one or more client programs 106 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of the client programs 106 may display various graphical user interfaces (GUIs) to present information to and/or receive information from one or more of the client devices 104.

As shown, the client 102 is communicatively coupled via one or more networks 108 to a network-based system 110. The network-based system 110 may be structured, arranged, and/or configured to allow the client 102 to establish one or more communications sessions with the network-based system 110 using various computing devices 104 and/or client programs 106. Accordingly, a communications session between the client 102 and the network-based system 110 may involve the unidirectional and/or bidirectional exchange of information and may occur over one or more types of networks 108 depending on the mode of communication. While the embodiment of FIG. 1 illustrates the communications system 100 deployed in a client-server operating environment, it is to be understood that other suitable operating environments and/or architectures may be used in accordance with the described embodiments.

Data and/or voice communications between the client 102 and the network-based system 110 may be sent and received over one or more networks 108 such as the Internet, a WAN, a WWAN, a WLAN, a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. The client 102 also may communicate with the network-based system 110 via a telephone call to a customer service agent and/or interactive voice response (IVR) system made over a mobile telephone network, a landline network, and/or a VoIP network. In wireless implementations, the client 102 may communicate with the network-based system 110 over the Internet via a WLAN or mobile telephone network that supports WWAN communications services. The client 102 also may communicate over a mobile telephone network via SMS and/or MMS messaging. It is to be appreciated that the embodiments are not limited in this regard.

In various usage scenarios, communication sessions and/or messaging between the client 102 and the network-based system 110 may involve multiple modes of communication and/or multiple networks. In some cases, for example, the client 102 may initiate communication with the network-based system 110 by interacting with a web site. In response, the network-based system 110 may communicate with the client 102 in a variety of ways such as via the web site, e-mail, IM, SMS, MMS, and/or a telephone call from a customer service agent and/or IVR system. The communication from the network-based system 110 may comprise a message (e.g., e-mail, IM, SMS, MMS) containing relevant static or dynamic content, an embedded hyperlinked URL for directing the client 102 to a web site, and/or a hyperlinked telephone number for allowing the client 102 to click and place a telephone call to an agent (e.g., customer service agent and/or IVR system) of the network-based system 110.

When communicating with the network-based system 110, the client 102 may employ one or more client devices 104 and/or client programs 106. In various implementations, the client devices 104 and/or client programs 106 may host or provide one or more interfaces for communicating with the network-based system 110. Exemplary interfaces may include a web interface, an API interface, a messaging interface, and/or other suitable communication interface in accordance with the described embodiments. The client programs 106 for communicating with the network-based system 110 may comprise, for example, pre-installed, authored, downloaded, and/or web-based computer programs.

The client programs 106 provided by one or more of the client devices 104 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In various usage scenarios, the client 102 may use a web client to provide an interface (e.g., HTTP interface) for navigating to a web site associated with the network-based system 110 and for requesting and receiving web page data from the network-based system 110. For example, the client 102 may use the web client to navigate to a web site associated with the network-based system 110 by entering a URL into a web browser address bar and/or by clicking on a hyperlinked URL delivered to the client 102 via a web page, web-based application, e-mail, IM, SMS, MMS, and/or other delivery mechanism.

In one or more embodiments, the web client may comprise or be implemented as a web browser toolbar for communicating with the network-based system 110. In such embodiments, the web browser toolbar may include, for example, a button (e.g., dedicated, customized, add-on) and/or a hyperlinked URL for navigating to a web site associated with the network-based system 110. The web browser toolbar also may implement enhanced features such as a search engine interface (e.g., text entry box, input fields, checkboxes, clickable hyperlinks) and/or one or more pull-down menus for accessing the network-based system 110, sending information (e.g., search query, keywords, user preferences, menu selections) to the network-based system 110, and/or receiving information (e.g., search results, relevant static or dynamic content) from the network-based system 110.

In one or more embodiments, the web client may comprise or be implemented as a widget such as a desktop or mobile widget for communicating with the network-based system 110. In such embodiments, the desktop or mobile widget may comprise web-based code, an interpreter, a virtual machine, and/or an API implementation to request, receive, present, and/or update content hosted by the network-based system 110. The desktop or mobile widget may comprise, for example, a client-side web application displayed on the desktop or phone-top of one or more of the client devices 104 implemented using various web technologies and programming languages. In various implementations, the desktop or mobile widget may be supported by a host runtime environment such as a web browser or suitable rendering engine and/or may be installed and run as a stand-alone application outside of a web browser.

In various embodiments, the network-based system 110 may provide users with one or more client-side web applications as described in co-pending U.S. patent application Ser. No. 12/275,783 titled "System and Methods for Providing Location-Based Upcoming Event Information Using a Client-Side Web Application Implemented on a Client Device," which was filed on Nov. 21, 2008 and is incorporated by reference in its entirety. In such embodiments, once downloaded and installed on a client device (e.g., PC or mobile device) of the user, the client-side web application may be configured to provide upcoming event information based upon the location of the user.

The client programs 106 executed by one or more of the client devices 104 may include a programmatic client for accessing and communicating with the network-based system 110. Along with performing a certain set of functions, the programmatic client may include, for example, an implementation of an API provided by the network-based system 110 for enabling access to and/or communication with various elements (e.g., servers, databases) of the network-based system 110. In various embodiments, the API implementation may comprise executable code in accordance with an SDK provided by the network-based system 110.

In some usage scenarios, the programmatic client may be implemented as a stand-alone or web-based database, point-of-sale (POS), and/or inventory management application for managing a large volume of available inventory and communicating with the network-based system 110. The programmatic client may be employed, for example, by high-volume sellers to author, update, and manage a large number of inventory listings. In some cases, a high-volume seller may use the programmatic client to perform batch-mode communication with the network-based system 110. The batch-mode communication from the high-volume seller may comprise data for numerous inventory items (e.g., hundreds, thousands) for publication by the network-based system 110. The programmatic client also may be used to communicate with the network-based systems in real-time. For example, communications from the high-volume seller may comprise real-time inventory updates so that the listings published by the network-based system 110 accurately reflect the available inventory of the high-volume seller.

The client programs 106 executed by one or more of the client devices 104 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may required and/or launch an Internet connection in the background when executed.

In various embodiments, the communications system 100 includes, among other elements, one or more other online marketplace systems 112. The other online marketplace systems 112 may communicate with and enable the network-based system 110 to provide the client 102 with additional services and/or information such as additional ticket inventory. In various embodiments, access to the network-based system 110 may provide the user with the ability to receive aggregated content and/or online marketplace and ticket fulfillment services of the network-based system 110 and one or more other online marketplace systems 112 (eBay® services, Kijiji™ services, PayPal™ services, etc.). For example, the location-based upcoming event information may include event listings published by sellers via the online marketplace services of the network-based system 110 as well as event listings published by sellers via one or more of the other online marketplace systems 118 (e.g., eBay® online marketplace, Kijiji™ online marketplace).

As shown in FIG. 1, the communications system 100 includes a third party 114 which, in turn, may comprise or employ a third-party server 116 hosting a third-party application 118. The third-party server 116 and/or third-party application 118 may host a third-party web site associated with or employed by a third party 114 such as an affiliate, partner, or other third-party entity or user in accordance with the described embodiments. In some usage scenarios, one or more of the client programs 106 may be used to access the network-based system 110 after initially communicating with a third-party web site. For example, the web site of the third party 114 (e.g., affiliate, partner) may comprise a hyperlinked advertisement that, when clicked, directs to the web client to a web page hosted by network-based system 110. In some cases, the third party 114 may be directly or indirectly compensated for directing traffic from the third-party web site to the web site of the network-based system 110 and/or in the event that an electronic commerce transaction results after a user is directed from the third-party web sites to the web site of the network-based system 110.

In accordance with various embodiments, the network-based system 110 may provide online marketplace and ticket fulfillment services for buyers of tickets for live events such as sports, concerts, theater, and other entertainment events. In one or more of such embodiments, the third-party application 118 hosted by the third party 114 may promote, enhance, complement, supplement, and/or substitute for one or more services provided by the network-based system 110. In particular, the network-based system 110 may communicate with and provide location-based services to buyers of event tickets via a server-side web application implemented by the third party 114, as will be described in greater detail below.

In various embodiments, the network-based system 110 may communicate with and provide online services to users such as buyers and sellers of goods. It is to be appreciated that goods for purchase and/or sale may include both tangible goods (e.g., physical tickets, electronic tickets), intangible goods (e.g., rights and/or licenses that are afforded by the tickets), and other goods in accordance with the described embodiments. It also is to be appreciated that users other than buyers and/or sellers may communicate with the network-based system 110. In some cases, for example, the client 102 may be associated with an administrator or customer service agent and may communicate with the network-based system 110 to monitor, update, and/or otherwise manage one or more computing devices and/or services of the network-based system 110.

FIG. 1 illustrates an exemplary embodiment of the network-based system 110 for providing online ticket marketplace. As shown, the network-based system 110 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers.

In various implementations, the servers of the network-based system 110 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of the network-based system 110 may be communicatively coupled with each other via a local area network (LAN) and/or suitable intranet or back-end network.

The network-based system 110 may comprise one or more communications servers 120 for providing suitable interfaces to enable communication using various modes of communication and/or via one or more networks 108. In the embodiment of FIG. 1, the communications servers 120 include a web server 122, an API server 124, and a messaging server 126 to provide interfaces to one or more application servers 130. The application servers 130 of the network-based system 110 may be structured, arranged, and/or configured to provide various online marketplace and/or ticket fulfillment services to users that access the network-based system 110.

In various usage scenarios, the client 102 may communicate with the applications servers 130 of the network-based system 110 via one or more of a web interface provided by the web server 122, a programmatic interface provided by the API server 124, and a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may be arranged to host web pages (e.g., HTML documents) and provide an appropriate web interface (e.g., HTTP, CGI, etc.) for enabling data to be presented to and received from entities via the Internet. The web server 122 may be arranged to communicate with web clients and/or applications such as a web browser, web browser toolbar, desktop widget, mobile widget, web-based application, web-based interpreter, virtual machine, and so forth. The web server 122 may provide a web interface to enable access by the client 102 and/or the third party 114 to the various services and functions provided by the application servers 130. For example, the web server 122 may be arranged to receive data from the client 102 and/or third party 114 and to pass the data to one or more application servers 130 within the network-based system 110. The web sever 122 also may present the client 102 and/or third party 114 with relevant static and dynamic content hosted by the network-based system 110 in response to various requests and/or events.

The API server 124 may be arranged to communicate with various client programs 106 and/or a third-party application 118 (e.g., third-party web site) comprising an implementation of API for the network-based system 110. The API server 124 may provide a programmatic interface to enable access by the client 102 and/or the third party 114 to the various services and functions provided by the application servers 130. For example, the programmatic interface provided by the API server 124 may be used for batch-mode and/or real-time communication with a high-volume seller for receiving and updating inventory listings. The programmatic interface provided by the API server 124 also may be used to communicate relevant static or dynamic content hosted by the network-based system 110 to an API implementation of one or more client programs 106 and/or a third-party application 118 (e.g., third-party web site). The API implementation may comprise, for example, executable code in accordance with a SDK provided by the network-based system 110.

The messaging server 126 may be arranged to communicate with various messaging clients and/or applications such as e-mail, IM, SMS, MMS, telephone, VoIP, video messaging, and so forth. The messaging server 126 may provide a messaging interface to enable access by the client 102 and/or the third party 114 to the various services and functions provided by the application servers 130. For example, the messaging interface provided by the messaging server 126 may be used to communicate with the client 102 and/or the third party 114 in a variety of ways such as via e-mail, IM, SMS, MMS, video messaging, and/or a telephone call (e.g., landline, mobile, VoIP) with a customer service agent and/or IVR system.

When implemented as an online ticket marketplace, the application servers 130 of the network-based system 110 may provide various online marketplace and ticket fulfillment services including, for example, account services, buying services, selling services, listing catalog services, dynamic content management services, delivery services, payment services, notification services, and other services in accordance with the described embodiments. In the exemplary implementation shown in FIG. 1, the application servers 130 may comprise an account server 132, a selling server 134, a buying server 136, a listing catalog server 138, a dynamic content management server 140, a payment server 142, a notification server 144, and a delivery server 146 structured and arranged to provide such online marketplace and ticket fulfillment services.

The application servers 130, in turn, may be coupled to and capable of accessing one or more databases 150 including a subscriber database 152, an active events database 154, and a transaction database 156. The databases 150 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

Account Services

The account server 132 implemented by one or more of the application servers 130 may allow a user to establish and/or manage a subscriber account with the network-based system 110. For example, while some services provided by the network-based system 110 may be generally accessible, a user may be required to access an existing subscriber account or register a new subscriber account with the network-based system 110 in order to receive certain customized and/or subscriber-specific services.

To create a subscriber account, a user may provide the network-based system 110 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, the network-based system 110 may create the subscriber account and store the account information in the subscriber database 152.

After a subscriber account is created, the user may view and/or make changes to account information, add or edit existing contacts, retrieve or change the password, view and edit sources of funds and/or financial value on file, view and edit payment options, and/or otherwise manage the subscriber account.

To effectuate the buying or selling of goods such as event tickets, the user may be required to link the subscriber account of to a source of funds and/or financial value for completing different transactions via the network-based system 110. It can be appreciated that the user may provide various types of entities or third-party financial accounts capable of supplying or receiving funds and/or financial value in accordance with the described embodiments. Exemplary entities and/or third-party financial accounts may include, without limitation, a bank, bank account, lender, line-of-credit, credit card company, credit card account, debit card, prepaid debit card account, third-party payment services account (e.g., PayPal™ account), payroll account, check, money order, or any other suitable source of financial value.

Additionally or alternatively to linking the subscriber account to a source of financial value based on a commercial currency (e.g., U.S. dollar), a user may link to the subscriber account to a source of financial value based on a proprietary and/or promotional currency (e.g., points, rewards, coupons) capable of accumulation and/or redemption by the user to pay for goods or services. It can be appreciated that multiple sources of funds and/or financial value associated with the user may be linked to the subscriber account enabling the user to select among such sources to effectuate different payment transactions via the network-based system 110.

The user may select various options for receiving payment when a sale is effectuated via the network-based system 110. For example, the user may request payment for sales via check, deposit to a third-party payment services account (e.g., PayPal™ account) or Season Ticket Account, and/or other type of source capable of receiving funds and/or financial value in accordance with the described embodiments. In some implementations, the user may select to donate some or all of the proceeds of a sale to a third-party such as a non-profit organization or entity (e.g., charity, foundation, fund, alliance, society) as described in co-pending U.S. patent application Ser. No. 10/697,850 titled "System and Method for Providing Logistics for a Sale or Transfer of Goods with Proceeds Provided to a Third Party," which was filed on Oct. 30, 2003 and is incorporated by reference in its entirety.

When accessing the subscriber account, the user may view and/or manage various details of past and pending transactions. For example, the subscriber account may provide a seller with details regarding past and pending ticket sale listings (e.g., shipped, canceled, inactive, expired, deleted, active, pending confirmation, awaiting shipment) and may allow the user to track event listings, modify the prices of event listings, view and confirm received orders, view and confirm orders to ship, print or reprint shipping labels, view shipped orders, view canceled orders, view the status of payments and edit payment options, view past payments, and so forth. The subscriber account also may provide a buyer with details regarding past and pending ticket purchase transactions (e.g., past orders, purchased, delivered, canceled, expired, order status, delivery status, active bids, auctions lost) and may allow the user to view order history, track active bids, modify offers, download and print electronic tickets, view and edit payment options, and so forth.

In various implementations, the user may customize a subscriber account with one or more interests and ticketing preferences. For example, the user may add and edit information associated with the subscriber account regarding one or more cities, venues, artists, teams and sporting events, theaters, and season ticket and packages of interest to the user.

The user also may customize a subscriber account with one or more notification preferences. For example, the user may configure the subscriber account to receive notifications, change notifications, and/or discontinue notifications. In some cases, the user may request to receive promotions via an e-mail newsletter featuring events happening in a particular location. The user also may subscribe to receive customized alert notifications in a variety of ways such as via e-mail, IM, SMS, MMS, and/or other suitable delivery mechanism. In addition to receiving such notifications via e-mail, IM, SMS, MMS, the user may access the subscriber account and view recent notifications such as alert notifications and other messages received in the past week.

Selling Services

The selling server 134 implemented by one or more of the application servers 130 may allow a user to offer goods for sale via an online marketplace provided by the network-based system 110. To list goods for sale such as a single or multiple event tickets, a seller may provide the network-based system 110 with required event information such as event, location of the tickets, sale type, ticket quantity, seating details (e.g., section, row, seat, comments), price, and payment method. After receiving the required event information and instructions from the seller to publish an event listing, the network-based system 110 may create an active event and store the event information in the active events database 154 for publication to users of the network-based system 110. It can be appreciated that upon the sale of the tickets, one or more delivery options may be available depending on the locations of the buyer and the seller, the time remaining before the event, and/or the form of the tickets (e.g., physical tickets, electronic tickets).

In various embodiments, a seller may post an event for publication as described in co-pending U.S. patent application Ser. No. 11/689,787 titled "System and Method for Posting Multiple Items for Sale," which was filed on Mar. 22, 2007 and is incorporated by reference in its entirety. In such embodiments, the seller may select the appropriate type of event, city, or venue for event tickets being offered for sale, and then may be queried or prompted to select a specific event after making selections from various categories and subcategories presented via a set of interactive pull-down menus.

In one implementation, for example, a seller may be presented with a pull-down menu listing categories such as sports tickets, concert tickets, theater and arts tickets, and ticket gift certificates. If the seller selects the sports tickets category, a pull-down menu listing sports tickets such as baseball tickets, basketball tickets, football tickets, and other types of sports tickets is presented. If the seller then selects football tickets, a pull-down menu listing sports subcategories such as NFL tickets, CFL tickets, and NCAA tickets is presented. If the seller selects the NFL tickets, a pull-down menu listing ticket subcategories such as NFL regular season tickets, NFL playoff tickets, and NFL pro bowl tickets is presented. If the seller selects the NFL regular season tickets, a pull-down menu listing NFL teams is presented. Once the seller selects tickets for particular NFL team, a listing of available events including event details (e.g., team and opponent, date, time, venue name) for the team are displayed which can be sorted by event, date, and venue. The seller may then select an event from the listing of available events. It can be appreciated that appropriate sets of pull-down menus for listing categories and successive subcategories may be presented for any type of event ticket in accordance with the described embodiments.

After an event has been selected, the seller may provide the network-based system 110 with the shipping location of the tickets and verify current contact information (e.g., address and telephone phone number). The seller may provide a sale type such as a fixed price sale (e.g., set price capable of subsequent modification), a declining price sale (e.g., automatically decreasing price over time from maximum price to minimum), or an auction sale (e.g., buyers bid from a starting price during an open period with the highest bidder placing an order when the auction closes).

The seller may provide the ticket quantity for specific seats or general admission. The seller may provide the ticket quantity and may allow the quantity of offered tickets to be split among several buyers in multiples of two. The seller may provide seating and ticket details for the offered tickets such as section, row, seat numbers, and may provide other comments. In some cases, the seller may select to prevent buyers from viewing the specific seat numbers when the event listing is published by the network-based system 110.

The seller may provide the price per ticket and the ending date of the sale when the event listing is to be removed from publication. For some events, the event listing may expire three business days before the event. In certain markets, tickets may be sold on consignment and the listing may remain until the start of the event.

The seller may provide a selected payment method for the sale of the tickets such as via check, deposit to a third-party payment services account (e.g., PayPal™ account), Season Ticket Account, and/or other type of source capable of receiving funds and/or financial value, and/or donation to a third-party such as a non-profit organization or entity.

Buying Services

The buying server 136 implemented by one or more of the application servers 130 may allow a user to locate goods offered for sale via an online marketplace provided by the network-based system 110. To find goods for sale such as a single or multiple event tickets, a buyer may view active event listing published by the network-based system 110.

In accordance with various embodiments, information may be presented to and/or received from information from the user via one or more user interfaces presented on the display of a client device (e.g., PC or mobile device). The user interfaces presented to the user by a client-side web application may comprise a search engine interface (e.g., text entry boxes, input fields, checkboxes, clickable hyperlinks, pull-down menus, etc.) for allowing the user to provide event criteria for searching and/or filtering event listings. The user interfaces presented to the user also may comprise search results including upcoming event listings that satisfy the event criteria.

For example, the buyer may browse active event listings by clicking and following links for various event categories and subcategories such as sports tickets, concert tickets, theater tickets, cities, sports, teams, artists, show type (e.g., Broadway, opera, ballet, comedy), event names, and so forth. The buyer also may search for events using a search engine interface and/or one or more pull-down menus. For example, the buyer may enter one or more keywords into a search engine text entry box and view results comprising active events that satisfy the query. In various implementations, the buyer may be presented with a ticket finder screen comprising a plurality of pull-down menus for allowing the buyer to quickly formulate a search by selecting a category (e.g., sports, concert, theater, etc.), a location (e.g., city), and a number of tickets from the pull-down menus.

In some embodiments, a user may search for and/or request upcoming event information based on a variety of event criteria such as an event name, category, city, venue, artist, genre, team, player (e.g., starting pitcher, favorite player), theater, date range, date, number of tickets, price range, ticket attributes (e.g., zone range, zone, section range, section, row range, row, seat number range, seat number), and/or combination thereof. Accordingly, the event criteria included in a search query may comprise ticket attributes as well as one or more conditions associated with the event parameters for requesting information for such upcoming events only when such conditions are met.

Various combinations of event criteria are possible in accordance with the described embodiments. For example, a user may request upcoming event information specifying combinations such as a certain number of tickets and a maximum price, a particular artist and a certain city, a certain player and a particular event venue, and so forth. A user also may request upcoming event information based on one or more ticket attributes. For instance, a user may request a certain number of tickets for an upcoming event in one or more specified zones, sections, rows, and/or or seats. Additionally, event criteria may be applied alone or in combination across one or more events. A user may request, for example, tickets in a certain row (e.g., front row) or row range (e.g., rows 1-5) within a specified zone (e.g., club infield) or section (e.g., section 224) for a designated team (e.g., professional baseball team) and/or for one or more games (e.g., particular opponent, rivalry game). The embodiments are not limited in the regard.

It can be appreciated that in some cases, an upcoming event may not satisfy all event criteria specified by the user. For example, tickets for an upcoming event may be available but not within a price range specified by the user. Additionally, there may be no upcoming events that satisfy the event criteria specified by the user when there are no available tickets such as when no sellers have listed tickets for an event and/or before tickets for an event go on sale. In such cases, the client-side web application may inform the user that there are no search results satisfying the search criteria and then perform a new search with relaxed search criteria. Alternatively or additionally, the client-side web application may automatically relax the search criteria and attempt another search.

Once a buyer has located and selected an event, the tickets being offered for sale for the event may be presented to the buyer. In various embodiments, the user may view the details of tickets being offered for sale and the location of tickets in the event venue as described in co-pending U.S. patent application Ser. No. 11/552,782 titled "Method and System for Illustrating Where a Ticket is Located in an Event Venue," which was filed on Oct. 25, 2006 and is incorporated by reference in its entirety. In such embodiments, the buyer may be presented with an interactive event venue seat map and details of available tickets according to criteria specified by the buyer.

In one implementation, for example, after selecting an event the buyer may be presented with an interactive event venue seat map and an initial listing of all event tickets for sale. The event listings may include details such as section, row, quantity, and price and may be sorted by the buyer according to such details. The sections of the interactive event venue seat map for which tickets are available may be displayed in color while sections having no available tickets may be displayed in white.

Within the interactive event venue seat map, comparable or similarly-located (e.g., upper level) sections having available tickets may be displayed in the same color while sections having available tickets that are not comparable or similarly-located may be displayed in different colors. For example, the colors used in the sections may correspond to zones for the sections with each zone comprising several comparable or similarly-located sections. Along with the interactive event venue seat map, the buyer may be presented list comprising the different zone names and the color used for each zone. The names of zones having available tickets may be displayed in black text, while the names of zones having no available tickets may be displayed in gray text.

When presented with the interactive event venue seat map, the buyer may roll over a particular section causing a roll-over screen to appear indicating the quantity and price range of tickets available in that section. By clicking on a particular section, the event listings may be filtered to display only the event listings in the selected section along with the specific details (e.g., section, row, quantity, price) for such tickets. The buyer also may zoom-in, zoom-out, drag, and/or rotate the interactive event venue seat map.

When presented with the initial listing of all event tickets for sale, the buyer may filter the initial listing by inputting criteria such as one or more price ranges (e.g., $75-$286, $286-$349, $349-$442, $442-$559, and $559 and up). Once the buyer selects a price range, the event listings are filtered to display only the event listings in the selected price range. Additionally, the interactive event venue seat map is modified to display sections in color for which tickets are available in the selected price range.

Each event listing may include ticket attributes such as section, row, quantity, and price. Each listing also may include a link to view additional details that when clicked may display the ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets.

To place an order for the tickets, the buyer may provide a delivery location, select a method of payment (e.g., credit card), confirm the transaction details (e.g., description of the tickets, delivery method, delivery location, payment amount, and method of payment), and the complete the purchase. When the buyer places the order, a confirmation e-mail is sent to the buyer, and the seller is notified of the order request via e-mail and requested to confirm the availability and delivery of the tickets. Upon receiving confirmation from the seller that the tickets have been sent, the buyer is notified as to when delivery can be expected. It can be appreciated that upon the sale of the tickets, one or more delivery options may be available depending on the locations of the buyer and the seller, the time remaining before the event, and/or the form of the tickets (e.g., physical tickets, electronic tickets).

Listing Catalog Services

The listing catalog server 138 implemented by one or more of the application servers 130 may be arranged to receive and respond to queries and/or to provide access to event information stored in the active events database 154. A query to the listing catalog server 138 may comprise, for example, a search query, web query, web feed request (e.g., RSS feed request, ATOM feed request), API request, HTTP request (e.g., Get, Post, etc.), a web form submission (e.g., XHTML/HTML form), and/or suitable request mechanism in accordance with the described embodiments. In various implementations, a query may be submitted to the listing catalog server 138 via one or more communications servers 120 from one or more client devices 104, client programs 106, a third-party server 116, and/or a third-party application 118. Queries also may be submitted to the listing catalog server 138 internally from other application severs 130 of the network-based system 110.

In one embodiment, the listing catalog server 138 may be implemented by a distributed architecture comprising a plurality of distributed indexing modules. Each of the distributed indexing modules may provide an interface for receiving queries from front-end servers such as the communications servers 120. The distributed indexing modules may store and build updatable indexes against which a query can be checked to expedite retrieval of a query result. The indexes may comprise, for example, common keywords or search terms and event IDs linked to such keywords or search terms. The distributed indexing modules also may cache common query results.

The distributed indexing modules may be arranged to receive updated indexing information brokered via a message bus from a local gatherer module. The local gatherer, in turn, may be coupled to and collect indexing information from the active events database 154. The indexing modules may update and/or filter the indexes based on the updated information received from the local gatherer module and/or information from other indexing modules.

The local gatherer module may be arranged to periodically scan items stored in the active events database 154 and obtain updated indexing information. For example, the local gatherer module may request items from the active events database 154 that have changed within a given time period. The event information stored in the active events database 154 may change frequently as new event listings for upcoming events are added and then removed when the tickets for such events listings are purchased. Furthermore, the active events database 154 may store relatively static information for an event such as category (e.g., sports, concerts, theater), as well as real-time dynamic information such as current event listings and true levels of ticket inventory. It can be appreciated that the event information maintained by the active events database 154 may be extremely dynamic especially in cases where LMS and electronic ticketing services are provided by the network-based system 110.

The listing catalog server 138 may receive and respond to the queries with event information for upcoming events that satisfy such queries. The event information may be provided locally from the listing catalog server 138, if available (e.g., cached), and/or may be retrieved by the listing catalog server 138 from the active events database 154. In various implementations, event information from the listing catalog server 138 may be communicated via one or more communications servers 120 to one or more client devices 104, client programs 106, a third-party server 116, and/or a third-party application 118. The event information from the listing catalog server 138 also may be provided internally to other application severs 130 of the network-based system 110.

In accordance with various embodiments, the listing catalog server 138 provides detailed ticket listing and event data, as well as information (e.g., metadata) about the classifications of that data. An event may be, for example, a sports, concerts, theater, or exclusives event, for which sellers are permitted to post tickets for sale. Genre is a category classification for classifying one or more events. Each event may be directly associated with one or more detailed-level genres. For example, an event or game of a particular team may be directly associated with a team tickets genre. That team tickets genre, in turn, may be classified under a more generic sport (e.g., baseball) genre. Geography (geo) is another category classification defining the location of an event. Category classification data may comprise, for example, search dimension data and/or metadata.

A ticket listing is a batch of individual tickets that sellers may post for sale via the network-based system 110. Ticket listings are associated with specific events and may have different restrictions such as the sale method (e.g. auction, fixed price, etc.) or whether the seller permits selling the constituent tickets in multiple batches or only as a single batch (e.g. ticket listing 'splits' may or may not be allowed). Ticket listings also contain information about the general type of seat within a specific venue (e.g., row, section, seats). Ticket listings also include the single price that each ticket within the listing is to be sold per the preference of the seller.

The data may be organized and/or stored by the listing catalog server 138 and/or stored in the active events database 154 within index documents. Exemplary types of index document include genre, geography, event, ticket, and others (e.g., venue, co-brand, logistics condition). Each unique index document instance may refer, for example, to a unique occurrence of a genre, geo, event, or ticket data set. Within each index document are fields which provide names and values of searchable attributes (e.g., price field) which allow searching for document instances (e.g., the value of the price field within a certain range).

Exemplary information parameters that may be included in various types of index document are described below in the following tables. It can be appreciated that the tables represent exemplary index document types and that other document types may be used in some implementations. It also can be appreciated that the index documents may include different event information parameters, additional event information parameters, or fewer information parameters than those described in the tables.

Exemplary information parameters that may be included in a genre index document are described below in the following table.

| Genre Index Document Fields Table | |
|---|---|
| Genre Document Field | Details |
| Active | indicates an active genre classification |
| ancestorDescriptions | shows an ordered list of space-separated parent genre names; from the most general to the most specific category level. A search for a match on any subset returns this query as a descendant. |
| ancestorGenreIds | shows an ordered list of parent genre unique ids; from the most general to the most specific category level. A search for a match on any subset returns this query as a descendant. |
| ancestorKeywords | shows comma-separated list of related keywords to ancestors of this genre. A search for a match on any subset of these keywords retrieves this descendant genre in its result set. |
| categorySearchKeywords | shows space-separated list of related keywords to this genre. A search for a match on any subset of these keywords retrieves this genre in its result set. |
| channel | shows general root category of site navigational flow to this sub-category. This usually corresponds to a browser tab label on the website (e.g. Sports, Concerts, Theater, Exclusives) |
| channelid | unique numeric id of genre document corresponding to channel field item |
| channelUrlPath | url string segment that site rewrites when navigating to this event genre category to make the HTTP Request URL more user-friendly than using id numbers. |
| dateLastIndexed | shows the date when this document was last added or updated into the document index to be searchable. This date time may be later than when the data was updated in the underlying base database. |
| deleted | indicates whether this genre has since been deleted and should no longer be used for sellers to post new ticket listings. |
| description | general description of genre |
| genreId | unique identifier for genre document |
| genre_parent_name | string corresponding to this genre's parent description |
| hidden | This indicates that an Active Genre can be used for creating new Events; but that this Genre will not be displayed on the site. |
| leaf | Is true if this genre is the most detailed category in its classification tree. False if it is the parent of more detailed genre categories |
| parent_id | the integer parent genre id of this genre. This is used to map the parent-child relationships among genres. |
| season_ticket_flag | This indicates whether this genre is being used as a time-search-dimension for a particular event season. |
| DocumentId | unique Id of indexed document as qualified by the Document Type |
| DocumentType | document type (e.g., genre) for results |
| urlpath | url string segment that site rewrites when navigating to this event genre category to make the HTTP Request URL more user-friendly than using id numbers. Corresponds to the current genre. |

Exemplary information parameters that may be included in a geography index document are described below in the following table.

Geography Index Document Fields Table

| Geography Document Field | Details |
| --- | --- |
| Active | indicates an active geo classification |
| dateLastIndexed | shows the date when this document was last added or updated into the document index to be searchable. This date time may be later than when the data was updated in the underlying base database. |
| deleted | indicates whether this genre has since been deleted and should no longer be used for sellers to post new ticket listings. |
| description | general description of this geography |
| geoId | unique numeric identifier for this geography document instance |
| hidden | This indicates that an event can be created for an active Geo; but that this Geo will not be displayed on the site. |
| parent_id | Unique number for parent geography id for this geography. This is used to map the parent-child relationships among geographies. |
| season_ticket_flag | This indicates whether this geo is being used as a time-search-dimension for a particular event season. |
| DocumentType | document type (e.g., geography) for results |

Exemplary information parameters that may be included in an event index document are described below in the following table.

Event Index Document Fields Table

| Event Document Field | Details |
| --- | --- |
| act_primary | Home Team Mascot |
| act_secondary | Away Team Mascot |
| date_inhand | Date on which the primary vendor starts selling tickets for the event |
| date_confirm | Date on which the seller must confirm |
| date_on_sale | Date on which the ticket can be sold |
| date_last_modified | Time of last change to the event |
| active | 1 = active event<br>0 = inactive event |
| allowedtoConform | 1 = seller allowed to confirm<br>0 = seller not allowed to confirm |
| allowedtosell | 1 = general public allowed to sell tickets<br>0 = generatl public not allowed to sell tickets |
| genre_parent | ID of the parent genre of the event |
| genre_grand_parent_id | genreId of the parent genre of the immediate genre_parent of this event |
| genre_grand_parent_name | name of the parent genre of the immediate genre_parent of this event |
| ancestorGenreIds | List of parent IDs, in order of hierarchy, identifying browsing path to reach the node |
| channelId | ID of the top level genre in the breadcrumb trail tied to the event |
| geography_parent | ID of the parent geo of the venue |
| ancestorGeoIds | List of geography IDs, in order of hierarchy, identifying browsing path to reach the geography node |
| event_date | Date and time of the event (GMT) |
| event_date_local | yyyy-mm-dd of the event |
| event_date_time | Date and local time of the event |
| hide_event_date | 1 = event date hidden<br>0 = event date not hidden |
| is_eticket_allowed | 1 = e-tickets allowed<br>0 = e-tickets not allowed |
| searchKeywords | searchable terms for the event |
| DocumentType | document type (e.g., event) for results |
| venue_name | Name of the venue for the event |
| totalTickets | Actual number of tickets listed for the event |

Exemplary information parameters that may be included in a ticket index document are described below in the following table.

Ticket Index Document Fields Table

| Ticket Document Field | Details |
| --- | --- |
| event_id | eventId of the event for which the tickets have been listed. |
| end_date | the date and time up to which the ticket can be sold. The listing becomes inactive and the ticket cannot be sold if the end date is passed. |
| Id | the ticket listing Id used to uniquely identify the listing |
| ticket_medium_id | medium of tickets.<br>1 = Paper tickets<br>2 = PDF tickets<br>3 = Barcode tickets |
| ticket_list_type_id | contains the different types of listings that can be posted. A listing may be a ticket (seat) or a parking pass or a combination.<br>1 = Ticket plus parking pass bundled<br>2 = Only tickets<br>3 = Only parking pass |
| sale_method_id | represents the type of sale method chosen by the seller for the listing.<br>0 = Auction listing<br>1 = Fixed price listing<br>2 = Declining price listing |
| quantity | number of tickets originally listed by the seller for an event |
| quantity_remain | number of individual tickets within a single ticket listing. This will start the same as the quantity originally listed and will be decremented as tickets are sold to reflect unsold quantity still available. |
| DocumentType | document type (e.g., ticket) for results |
| split_option | indicates if the ticket listing can be sold in multiple sub-batches rather than only as a single batch of tickets.<br>1 = ticket listing may be sold in multiples of the ticket_split number.<br>0 = ticket listing can only be sold as a single batch and not in multiple sub-batches. |
| ticket_split | When split_option = 1:<br>Never leave a quantity of 1 ticket remaining unless ticket_split is 1<br>Allow any multiple of ticket_split unless it breaks the above rules<br>Allow remainder of ticket_split multiples but only if this leaves an even split multiple |
| max_decay_price | upper limit for the ticket price in the declining price option |
| min_decay_price | lower limit for the ticket price in the declining price option |
| reserve_price | minimum price at which the seller would be willing to accept to sell his tickets |
| section | section of a seat within a venue |
| row_desc | row of a seat within a section of a venue |
| buy_it_now_price | price set by the seller to close the auction |
| start_price | depends on the value of the sale_method field<br>Auction, start_price = bid starting price<br>Declining, start_price = first offered price and will drop to reserve_price<br>Saled, start_price = fixed price |

-continued

Ticket Index Document Fields Table

| Ticket Document Field | Details |
| --- | --- |
| curr_price | current price per individual ticket |
| system_status | current status of the listing (active, inactive, hidden, pending lock) |
| showTicketKeyStr | derived field based on data from other base fields. The first part of this value is the type of document which in this case is always ticket. The second part indicates if the listing is active or inactive. This string is set to a derived ACTIVE status if the ticket quantity remaining is greater than zero, if the system_status is active, and the event end_date is earlier than NOW. Otherwise the listing is considered INACTIVE. The final part represents event_id. Using this field reduces the number of separate fields to search against. For example, the clause of the query using this field would look like: +showTicketKeyStr:ticketACTIVE512528 |

The listing catalog server 138 may provide HTTP access for remote applications to query for the data internal to the network-based system 110. The listing catalog server 138 may return document data for each document satisfying the query as formatted text. A count of the number of documents returned may be provided in the header section of the response. The text format of the results can be specified in the HTTP Request or, by default, may be a proprietary XML format of the network-based system 110.

In various implementations, the listing catalog server 138 may employ classification data hierarchies or metadata to classify event and ticket listings according to independent search dimensions (e.g., Genre and Geo). Classifications form a hierarchy or tree of categories. For example, events may be classified into genres categories. Genres, in turn, are themselves classified into a hierarchical tree-like structure. Within a hierarchy, each event may be associated with an immediate parent genre where that parent genre is the most detailed category or is at the lowest level of the hierarchical tree. As an example, the general baseball tickets genre is a parent of the more specific team tickets genre, and this forms a genre classification hierarchy or tree. For instance, a genre classification hierarchy may be as follows: all tickets—sports tickets—baseball tickets—2008 MLB Tickets—2008 MLB regular season tickets—team tickets. In this hierarchy, the team tickets genre would be considered a leaf node of the genre dimension classification hierarchy.

Events also can also be classified into geographies or location categories. Geographies, in turn, are themselves classified into a hierarchical tree-like structure analogous to the genre hierarchy structure. Again, each event may be associated with an immediate parent genre where that parent geography is the most detailed category or is at the lowest level of the hierarchical tree structure.

The listing catalog server 138 may contain data types which may be queried for details or fact data regarding posted event and ticket listings. The fact data, in turn, may contain specific measures such as specific occurrences of quantity and price. Each document includes an identifier (id) field for containing a unique numeric identifier. This id field may be used to map relationships between multiple documents of different categories. For example, the genre parent field of an event document refers to the unique genre field of a genre document. Accordingly, the one-to-many relationship among the genre parent and several events may be represented in this manner.

Dynamic Content Management Services

The dynamic content management server 140 implemented by one or more of the application servers 130 may be arranged to provide a user with relevant and/or related dynamic content customized according to a particular context of the user. The dynamic event information may comprise, for example, event information that changes as new event listings for upcoming events are added and as event listings are removed when the tickets for such events listings are purchased and real-time event-specific information such as current event listings, price ranges, and true levels of ticket inventory. Relevant or related dynamic content may comprise, for example, dynamic content customized according to the location of the user such as location-based advertising content (e.g., banner ads), relevant and/or related categories and subcategories (e.g., links for local sports teams, artists performing in the location, theater shows playing in the location), a list of event names and dates for upcoming events in the location arranged by category, and/or other type of dynamic featured content that changes according to the location of the user.

In some implementations, the appearance of a user interface displayed to the user may be customized or branded with dynamic content based on the location of the user and/or event criteria specified by the user. For example, a web page or web client may comprise a comprise a header, skin, or other designated area that dynamically displays different graphics (e.g., pictures, logos, backgrounds, etc.), advertisements, news, and/or other featured content received from the network-based system 110 according to the location and/or event criteria of the user.

In various embodiments, the dynamic content management server 140 may be structured, arranged, and/or configured to bind dynamic information to a particular node and/or combination of nodes defining the context of the user. Exemplary nodes may include, for example, geography nodes (e.g., event cities), category nodes (e.g., sports, concerts, theater), sports nodes (e.g., baseball, football, basketball), sports subcategory nodes (e.g., professional, college), music genre nodes (e.g., jazz, rock, alternative), theater subcategory nodes (e.g., musical, comedy), ticket subcategory nodes (e.g., regular season, playoff, bowl), conference nodes, team nodes, artist nodes, theater show nodes, venue nodes, event nodes, and so forth. It can be appreciated such nodes may be arranged (e.g., hierarchically) and/or in other ways in accordance with the described embodiments.

The dynamic content management server 140 may be configured bind dynamic content such as relevant and/or related categories and subcategories, event listings for upcoming events, promotional or advertising content, UI graphics, and/or various other types of customized content to a node or combination of nodes. When navigating a web site provided by the network-based system 110, for example, the user may be presented with links for selecting from among various locations, categories, and/or subcategories and for viewing content associated with such selections. When the user makes a particular selection, the context of the user may be defined by one or more nodes associated with such selection, and the user may be presented with dynamic content customized to the context of the user.

In various embodiments, the dynamic content management server 140 may implement a front-end query tool and presentation layer to query the listing catalog server 138 according to the context of the user. In response to the query, the dynamic content management server 140 may receive dynamic content (e.g., XML content) from the listing catalog server 138 and provide the dynamic content to one or more dynamic content modules embedded in a web page presented to the user. Accordingly, the content associated with event listings may change based on the context of the user, configurable parameters, and/or available inventory.

In one example, a user selects a particular city, and the dynamic content management server 140 has bound dynamic content to a geography node associated with the particular city. Upon selection of the particular city by the user, the context of the user may be defined at least in part by the geography node of the selected city, and the user may be presented with the dynamic content that is bound to the geography node. In this case, the user may be presented with a web page including dynamic content customized for the particular city such as graphics (e.g., pictures, background) and advertising content (e.g., banner ads) for the particular city, relevant and/or related categories and subcategories (e.g., links for local sports teams, artists performing in concert in the city, theater shows playing in the city), a list of event names and dates for upcoming events in the city arranged by category, and/or other type of dynamic content that changes according to the city selected by the user.

In another example, a user selects a particular football team, and the dynamic content management server 140 has bound dynamic content to a team node associated with the particular football team. Upon selection of the team by the user, the context of the user may be defined at least in part by the team node, and the user may be presented with the dynamic content that is bound to the team node. In this case, the user may be presented with a web page including dynamic content customized for the particular team. For example, the web page presented to the user may be dynamically branded with graphics (e.g., pictures, background), advertising content (e.g., banner ads), and/or news associated with the particular team. The user also may be presented with event listings for upcoming games for the team as well as relevant and/or related categories and subcategories (e.g., links for road games, playoff games) for the team. In this implementation, the context of the user may be defined by one or more other nodes in a hierarchical path to the team node such as a category node (e.g., sports), sports nodes (e.g., football), sports subcategory node (e.g., professional), and ticket subcategory node (e.g., regular season). As such, the user may be presented with dynamic content bound to one or more of such nodes such as links to other professional football teams for which regular season tickets are available.

It can be appreciated that the embodiments are not limited to the foregoing examples and that dynamic content may be bound to a particular nodes and/or a combination of nodes for customizing that content displayed to a user based on the context of the user. Accordingly, the dynamic content management server 140 may be used to create dynamic content campaigns including a various types of static and dynamic content and to bind such campaigns to nodes or groups of nodes that define a context of the user. It also can be appreciated that a node and/or combination of nodes can be detected as a user selects one more links and/or in other ways such as when a query is submitted (e.g., text entry, selection of checkboxes, selection from a pull-down menu), a search result is returned, or in any other way in accordance with the described embodiments.

Payment Services

The payment server 142 implemented by one or more of the application servers 130 may be arranged to effectuate and/or manage payments between buyers and sellers and to post and track financial transactions for users of the network-based system 110. Transaction information for past and pending transactions may be stored by the network-based system 110 in the transaction database 156. The payment server 142 also may provide dispute resolution mechanisms to handle payment disputes arising between transacting parties and/or fraud prevention mechanisms to prevent fraudulent transaction, unauthorized use of financial instruments, non-delivery of goods, abuse of personal information, and so forth. While the payment server 142 is shown in FIG. 1 as forming part of the networked-based system 110, it will be appreciated that the payment server 142 may form part of a third-party payment system that is separate and distinct from the network-based system 110 in alternative embodiments.

In various implementations, the payment server 142 may account for a transfer of funds and/or financial value by debiting the a source of funds and/or financial value linked to the subscriber account of the buyer and crediting a source of funds and/or financial value linked to the subscriber account of the seller. For example, the network-based system may securely communicate with one or more financial institutions such as a bank or credit card company over one or more networks 108 and arrange the transfer of funds and/or financial value from the buyer to the seller. It can be appreciated that while certain settlement mechanisms may be described for purposes of illustration, the embodiments are not limited in this regard, and a variety of settlement networks and modalities may be used in accordance with the described embodiments.

In one embodiment, after the buyer reviews and confirms an order, the account (e.g., credit card) of the buyer is verified, and the sale amount (e.g., ticket price plus delivery cost) is authorized. The seller is notified of the proposed purchase by e-mail or other notification mechanism and requested to confirm that the tickets are still available and that the transaction can be completed.

Upon receiving confirmation from the seller, the account (e.g., credit card) of the buyer is charged. Funds from the account of the buyer may be electronically transferred into a merchant account associated with the network-based system 110, and a transaction fee may be deducted. The remaining proceeds are then directed to the seller by issuing a payment in accordance with the payment method selected by the seller such as via check, deposit to a third-party payment services account (e.g., PayPal™ account), Season Ticket Account, and/or other type of source capable of receiving funds and/or financial value, and/or donation to a third-party such as a non-profit organization or entity.

It can be appreciated that the network-based system 110 may provide a "double blind" complete ticket-sale transaction without interaction between buyer and seller. Namely, the network-based system 110 may facilitate an entire ticket-sale transaction without requiring any interaction between the seller and the buyer. The network-based system 110 controls and/or facilitates the entire sale and purchase process and serves as an intermediary between the buyer and seller effectively isolating the participation of the seller in the transaction from the participation of the buyer in the transaction. Accordingly, the identity of one transacting party can remain concealed from the other.

Notification Services

The notification server 144 implemented by one or more of the application servers 130 may be arranged to generate and send various types of notifications to users of the network-based system 110. The notification server 144 may communicate with users over one or more types of networks 108 (e.g., the Internet, a WAN, a WWAN, a WLAN, a mobile telephone network, a landline telephone network, a VoIP network, etc.) via interfaces provided the communications servers 120 such as the web server 122, API server 124, and/or messaging server 126. It can be appreciated that, in some implementations, notifications may be forwarded to users via an intermediary such as an Internet Service Provider (ISP), online service provider (OSP), web-based e-mail service provider, message aggregator (e.g., SMS aggregator), mobile transaction network entity, and so forth.

The notifications may comprise messages delivered to users via e-mail, IM, SMS, MMS, video message, telephone call as well as messages delivered to the subscriber account of the user. In some cases, the notifications may provide the user with information related to various online marketplace transactions. For example, notifications may be sent to sellers for indicating the status of event listings, informing the seller of offers (e.g., auction bids) for event listings or sales of similar tickets and allowing the user to modify the prices of event listings, notifying the seller of placed orders and requesting confirmation of the availability of tickets for such orders, providing delivery instructions and requesting confirmation of delivery, tracking shipped orders, providing the status of payments, and so forth. Notifications may be sent to buyers for tracking ticket purchase transactions (e.g., active bids, auctions lost) for event listings and allowing the buyer to modify offers, confirming an order and delivery, tracking shipped orders, providing pick-up instructions and requesting confirmation of receipt, downloading and print electronic tickets, and so forth.

In various embodiments, the user may subscribe to receive customized alert notifications for upcoming events as described in co-pending U.S. patent application Ser. No. 12/262,468 titled "System and Methods for Upcoming Event Notification and Mobile Purchasing," which was filed on Oct. 31, 2008 and is incorporated by reference in its entirety. In such embodiments, the notification server 144 may be arranged to generate and send an alert notification comprising a text message including relevant static or dynamic event information as well as an embedded hyperlink. The hyperlink may comprise a hyperlinked telephone number for allowing the user to place a telephone call to an agent of the network-based system 110 for transacting a mobile purchase. Alternatively or additionally, the hyperlink may comprise a URL or URI for navigating to the network-based system 110 for transacting the mobile purchase.

It can be appreciated that in some cases, an upcoming event may not satisfy all event criteria specified by the user. In some implementations, when there are no upcoming events that satisfy all the event criteria specified by the user, the user may select to receive alert notifications for one or more upcoming events conditioned on the complete satisfaction of the event criteria. In such implementations, the network-based system 110 may allow the user to select to receive an alert notification whenever an upcoming event that substantially and/or completely satisfies the search criteria is listed. For example, the user may select to receive "on sale" alert notifications when tickets that satisfy one or more preferences of the user become available. The network-based system 110 also may provide the user with various capabilities (e.g., preference settings and options) to allow the user to receive "on sale" alert notifications for preferred tickets and to allow the user to automatically and/or optionally purchase such preferred tickets.

Delivery Services

The delivery server 146 implemented by one or more of the application servers 130 may arrange the delivery of goods from the seller to the buyer. For the delivery of time-sensitive goods such as a single or multiple event tickets, the network-based system 110 may determine and present delivery options that ensure that an event ticket is delivered to the buyer before an event and the costs associated with such delivery options.

In various embodiments, the network-based system 110 may coordinate the delivery of event tickets as described in co-pending U.S. patent application Ser. No. 09/867,171 titled "System and Method for Providing Logistics for a Sale of Goods," which was filed on Sep. 27, 2001 and is incorporated by reference in its entirety. In such embodiments, the network-based system 110 may automatically arrange and/or facilitate the logistics for the delivery of event tickets from the seller to the buyer.

In one implementation, for example, when the buyer places an order, available delivery options are presented to the buyer that ensure that the event tickets can be delivered before the event either to the buyer or to a pick-up location (e.g., event venue will call or an office of the network-based system 110) in proximity to the buyer. The network-based system 110 may determine all available delivery options based on the form of the tickets (e.g., physical tickets, electronic tickets), the time remaining before the event, the location of the goods, the location of the buyer, pick-up locations in proximity to the buyer, and/or the capabilities one or more couriers (e.g., air/land couriers, express couriers, local couriers or "runners") that can execute the delivery within the time remaining before the event.

When a physical ticket is to be delivered, the network-based system 110 may determine and present shipping options to the buyer. The buyer may provide a delivery or pick-up location, and the network-based system 110 may automatically determine couriers capable of ensuring delivery and present a list identifying the couriers, the available shipping methods (e.g., two day, one day, overnight, same day) for each courier, and the associated cost of each shipping method.

When a courier and shipping method is selected by the buyer, the seller may be notified and presented with a printable shipping label for the courier and logistics for providing the tickets to the courier. For example, the network-based system 110 may automatically determine the closest courier facility in proximity to the seller and may allow and arrange for the courier to retrieve the tickets. In such cases, the network-based system 110 may communicate relevant information (e.g., seller address, delivery address, pick-up day and time frame) to the courier in order to coordinate ticket retrieval. If the courier cannot service any of the selected locations at any of the selected times, the network-based system 110 may require the seller to drop off the tickets at the nearest courier facility. The seller also may select to drop off the tickets at the nearest courier facility. If the seller selects or is required to drop off the tickets, the buyer may be provided with the location of the courier facility, driving or walking directions to the courier facility, and/or a map showing the courier facility.

Upon confirmation by the seller that the tickets have been sent or picked up, the network-based system 110 may communicate delivery tracking information to the buyer and/or seller. The network-based system 110 may notify the buyer of the delivery location and expected time and date of delivery. If the delivery location is at a pick-up location such as the event venue will call or an office associated with the network-based system 110, the buyer may be provided with the pick-up location, driving or walking directions to the pick-up location, and/or a map showing the pick-up location.

To ensure delivery to the buyer before an event, a last sale time may be associated with an event listing. In some cases, for example, the last sale time for an event listing may be three business days before the event to provide sufficient transit time to ensure completion of delivery. In such cases, the event listing will expire at the last sale time.

Last Minute Services

It can be appreciated that both sellers and buyers may desire the last sale time to be as close to the event start time as possible in order to maximize the opportunity to make a sale and the opportunity to witness an event. Accordingly, the network-based system 110 may provide sellers and buyers with various last minute services (LMS) for maintaining an event listing and the ability to sell and purchase listed tickets right up to the start of the event.

In one implementation, for example, the network-based system 110 may allow tickets to be sold on consignment and may maintain an event listing until the start of the event. When a seller requires delivery of physical tickets for an upcoming event, the seller may select to sell the tickets using LMS provided by the network-based system 110. The seller may request LMS and provide the network-based system 110 with contact information (e.g., name, address, telephone number, e-mail address), ticket information (e.g., event name, event venue, ticket event dates, closest city to the event), and authorization to release the tickets.

In response to the LMS request, the seller may be contacted by an agent of the network-based system 110 via telephone or other contact method and provided with additional selling information. Depending on the time remaining before the event, the seller may be instructed to ship or physically deliver the tickets to an LMS center associated with the network-based system 110. Typically, the location of the LMS center will be in close proximity to the event venue. The seller also may select to physically deliver the tickets to the LMS center. When physical delivery of the ticket to the LMS center is required or selected, the seller may be provided with the location of the LMS center, driving or walking directions to the LMS center, and/or a map showing the LMS center.

Once the tickets are delivered to the LMS center, the event listing may be maintained until the start of the event and the subsequent delivery of the tickets to a buyer is handled by the network-based system 110. For example, the LMS center and/or the network-based system 110 may handle the responsibility of shipping the tickets to the buyer, delivering the tickets to the event venue will call, and/or the keeping the tickets at the LMS center until pick-up by the buyer. It can be appreciated that the LMS provided by the network-based system 110 may facilitate delivery and allow the network-based system 110 to defer the last sale time until the start of the event.

Electronic Ticketing Services

In various embodiments, the network-based system 110 may provide electronic ticketing services for allowing a buyer to purchase one or more electronic tickets that can be used at the event venue. It can be appreciated that providing such electronic ticketing services may allow the network-based system 110 to defer the last sale time until the start of the event.

When the user selects an upcoming event from event listings published by the network-based system 110, a web page may be presented to the user that includes event information for the selected upcoming event such as the name of the event, the date and time of the event, the event venue, available ticket listings including ticket attributes (e.g., section, row, quantity, price), and so forth. In some cases, a purchaser of event tickets may provide the event information to the network-based system 110 in order to list the tickets for sale on a secondary market. In other cases, the venue, event promoter, or other type of ticket issuer may provide the network-based system 110 with event details such as event description, event venue, event date and time, artist, and so forth. In response, the network-based system 110 may manage the event, enable the venue to sell tickets for the event, manage the generation and distribution of electronic tickets, and facilitate the use of electronic tickets for access control to the venue. For example, the network-based system 110 may create an event listing, generate electronic tickets, publish available tickets for sale, and coordinate the sale of the electronic tickets.

In various embodiments, a web page presented to a user may comprise the event information along with a link to purchase electronic tickets and/or a link to view additional details. By clicking the link to purchase electronic tickets, the user may initiate a purchase of one or more electronic tickets. By clicking the link to view additional details, a subsequent web page may be displayed including ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets. In some cases, one or more web pages may include a link to view delivery options such as a location of, driving or walking directions to, and/or a map showing a pick-up location.

To effectuate an electronic ticket purchase, the user may be prompted to enter account information such as a unique username or e-mail address and a password. Upon receiving the required account information, the user is authenticated with the network-based system 110 and may initiate an electronic ticket purchase. After authentication, the network-based system 110 may transact the purchase using a source of financial value linked to the subscriber account of the user or may request the user to supply payment information (e.g., credit card account, PayPal™ account, etc.) for the transaction.

In various embodiments, a user may purchase electronic tickets and/or save electronic ticket information using a web client such as a web browser, web browser toolbar, and/or a desktop or mobile widget. For example, a user may save an electronic ticket and/or a hyperlink to a file associated with the electronic ticket in a subscriber account, in the web browser toolbar, and/or within a desktop or mobile widget. The user also may display information for and differentiate among purchased electronic tickets on a client device (e.g., PC or mobile device) via the web client.

The buyer may purchase one or more electronic tickets using a credit card or other source of funds or financial value linked to the subscriber account of the buyer. In one or more embodiments, the network-based system 110 may provide variable distribution and access control for purchased electronic tickers. For example, the network-based system 110 may provide the buyer with various delivery options for receiving and/or delivering the purchased electronic tickets.

The network-based system 110 may allow the buyer to have the electronic tickets delivered to an e-mail address associated with the buyer. The buyer may access the e-mail account, display the electronic tickets, and print out paper copies of the electronic tickets. Each of the paper copies of the electronic tickets may include a bar code which can be scanned at the event venue to allow access.

Alternatively or additionally, the buyer may instruct the network-based system 110 to send an electronic ticket to a mobile device (e.g., mobile phone or PDA) associated with the buyer. For example, the buyer may receive the electronic ticket at the mobile device and display a bar code of the electronic ticket on a screen of the mobile device which may be scanned at the event venue to grant access. In some usage scenarios, the buyer may receive an SMS message sent to a mobile device that includes a link to a web page to render a ticket. In other usage scenarios, the buyer may receive an MMS message sent to a mobile device that includes an image of the ticket. When the buyer chooses delivery to a mobile device, the buyer also may receive the ticket via e-mail as a backup in case the buyer wants to print out a paper copy to bring to or use at the event venue. The buyer may receive a text message at the time of ticket purchase and, if the tickets are purchased more than a predetermined time before the event (e.g., two days before the event), a reminder text message just before (e.g., one day prior to) the event.

In various embodiments, when the buyer purchases electronic tickets using a credit card, the buyer may access the venue by swiping the credit card used to make the purchase at the event venue. Alternatively or additionally, the buyer may use a driver's license to validate the ticket at the event venue. In some implementations, only the buyer may use the credit card used to make the purchase or a driver's license as a means of entry at the event venue. It can be appreciated that in such implementations, the buyer may validate his/her ticket at the venue as well as validate other purchased tickets for other people who are present with the buyer at the time of entry into the event venue.

The network-based system 110 also may provide the buyer with various delivery options for splitting the distribution of a single order of multiple electronic tickets among one or more recipients in addition to and/or other than the buyer. In some cases, for example, a buyer may purchase multiple electronic tickets (e.g., block of four electronic tickets) at once in a single order. In such cases, the buyer may choose from the provided options for variably distributing one or more of the purchased electronic tickets and/or the underlying rights associated with one or more of the purchased electronic tickets to different end recipients using different delivery mechanisms.

In various implementations, when a buyer purchases more than one ticket, the buyer may choose to have the tickets delivered directly to one or more other recipients for use at the event venue. For example, when multiple tickets are purchased in one order, the buyer can decide how individual tickets will be delivered electronically (e.g., e-mail, SMS, MMS, etc.) to another person. Upon delivery, each ticket may be used by the recipient independently of the buyer arriving at the event so that the entire party does not need to be present to enter the event venue. In such implementations, the buyer may be presented with delivery options as described in co-pending U.S. patent application Ser. No. 12/325,789 titled "System and Methods for Variable Distribution and Access Control for Purchased Event Tickets," which was filed on Dec. 1, 2008 and is incorporated by reference in its entirety.

In various implementations, the network-based system 110 may communicate the access rights to an electronic ticketing system at the event venue to associate the electronic ticket with the buyer and/or one or more recipients. Access control at the event venue may be done by a scanner that will read a bar code contained on the ticket sent as described above. In some cases, the buyer may access the venue by swiping the credit card used to make the purchase at the event venue or a driver's license. The buyer also may validate other purchased tickets for other people who are present with the buyer at the time of entry into the event venue. Each ticket delivered to a recipient may be used independently of the buyer arriving at the event so that buyer does not need to be present for the recipient to enter the event venue.

As the purchaser, the buyer may retain ownership and control of the distribution of the tickets. The network-based system 110 allows the purchased tickets to be easily delivered to different end recipients and may be configured to distribute the purchased electronic tickets and/or the underlying rights associated with electronic tickets differently based on ownership. In various embodiments, the tickets and/or the underlying rights associated with the tickets may be distributed to different end recipients by the network-based system 110 without affecting ownership, without relisting the tickets, and/or without requiring the recipients to purchase the tickets.

It can be appreciated that when ownership and control of the tickets is retained by the purchaser, the ability of a recipient to resell the tickets may be restricted. In some cases, however, the purchaser may choose to transfer complete ownership of an electronic ticket and/or the underlying rights associated with the electronic ticket to a recipient. In various embodiments, the network-based system 110 may be configured to support and broker the transfer of electronic tickets from the purchaser to multiple end recipients as well as from a recipient to another individual (e.g., buyer or other recipient). For example, the network-based system 110 may allow a recipient to list a received ticket for sale and may automatically handle the assignment of rights to a subsequent buyer when the ticket is purchased.

In cases where ownership and the underlying rights of an electronic ticket are transferred from the purchaser, the network-based system 110 may communicate access rights to an electronic ticketing system at the event venue to associate the electronic ticket with a different individual (e.g., recipient or subsequent buyer). In some embodiments, the network-based system 110 may instruct the ticketing system to activate new electronic tickets with new bar codes and to deactivate the original electronic tickets and original bar codes of the purchaser. The new electronic tickets can be delivered by the network-based system 110 and/or the electronic ticketing system for use by the recipient or subsequent buyer.

Alternatively or additionally, the network-based system 110 may instruct the ticketing system to associate new identification and/or authorization information (e.g., credit card, swipe card, password, pin code) with the electronic tickets and to deactivate identification and/or authorization information of the purchaser from the electronic tickets. Upon providing the required identification and/or authorization information to the electronic ticketing system, to a kiosk at the event venue, and/or to the network-based system 110, the recipient or subsequent buyer can use the electronic ticket to access the event venue.

Third-Party Access and Location-Based Services

As described above, the network-based system 110 may implement an online secondary ticket marketplace accessible to users via a desktop and/or mobile web browser. In one or more embodiments, the network-based system 110 also may provide access to one or more third parties (e.g., third party 114) and support the implementation of server-side web applications within third-party web pages to provide location-based upcoming event information. When implemented within third-party web pages, such server-side web applications may access and receive content and/or online services from the network-based system 110 and/or other online marketplace systems 112. The server-side web applications may be implemented within third-party web pages using various web technologies and programming languages (e.g., interpreted, compiled, scripting, virtual machine, etc.) and/or in accordance with a software development kit (SDK) provided by the network-based system 110 and/or other online marketplace systems 112. While FIG. 1 shows only the third party 114 for purposes of illustration, it can be appreciated that the communication system 100 may comprise multiple different third-parties.

In one or more embodiments, the third party 114 may provide a server-side web application such as a web widget and/or an API implementation for accessing the network-based system 110 via the third-party application 118, a third-party web site, and/or a third-party web page. In such embodiments, the server-side web application may comprise web-based code within a web page configured for communication with the network-based system 110 and/or other online marketplace systems 112. For example, the server-side web application may comprise web-based code for providing programmatic access to the network-based system 110 and/or other online marketplace systems 112 for requesting, receiving, presenting, and/or updating content hosted by the network-based system 110 and/or other online marketplace systems 112. In some implementations, the server-side web application implemented by the third party 114 may allow the third party 114 to host a third-party web page configured to display an aggregate of ticket inventory available from multiple online marketplaces including the network-based system 110 and one or more other online marketplace systems 112 and to provide the user with multiple purchasing options.

The network-based system 110 may support the implementation of server-side web applications within third-party web pages in various ways. For example, the network-based system 110 may publish or otherwise provide an SDK comprising a set of tools (e.g., instructions, APIs, protocols, formats, utilities, etc.) for enabling third-parties to implement a server-side web application and/or API implementation for accessing the network-based system 110.

The network-based system 110 also may make the server-side web application directly available and advertise or inform third parties (e.g., affiliates, partners) of the availability of the web application. The network-based system 110 may provide the third party 114 with a hyperlink to a server of the network-based system 110 or of other online marketplace systems 112 for downloading the server-side web application. In some cases, the size of the web application may be small enough such that the web application itself may be sent by the network-based system 110 to the third party 114 via e-mail or other suitable electronic delivery mechanism. The network-based system 110 also may present a web page (e.g., home page, development program page) including a clickable hyperlink, icon or banner, right-click save functionality, and so forth for downloading the server-side web application from a server of the network-based system 110 or other online marketplace systems 112. Alternatively or additionally, the network-based system 110 may make the server-side web application available via a web site or server that hosts a variety of different web applications.

Once implemented by the third party 114, the server-side web application may allow the third party 114 to access and receive content and/or provide online marketplace and ticket fulfillment services of the network-based system 110 to users. Such services may include, for example, access to account services, selling services, buying services, listing catalog services, dynamic content management services, payment services, notification services, and/or delivery services provided by the network-based system 110. In some implementations, the server-side web application implemented by the third party 114 also may receive and aggregate content and/or online services provided by other online marketplace systems 112 such as additional content and online marketplace and ticket fulfillment services (e.g., eBay® services, Kijiji™ services), payment services (e.g., PayPal™ services), and/or other content and online services for promoting, enhancing, complementing, supplementing, and/or substituting for one more services provided by the network-based system 110.

In one or more embodiments, the server-side web application implemented by the third party 114 may be configured to access the network-based system 110 for providing a user with upcoming event information based upon the location of the user. In various implementations, the server-side web application implemented by the third party 114 may determine the location of a user in response to the user manually inputting geographic information (e.g., address, city, state, zip code, venue) into a text entry box or input field, selecting a location from a displayed list or from a pull-down menu, or in any other suitable way in accordance with the described embodiments.

Alternatively or additionally, the location of the user may be automatically determined by the server-side web application implemented by the third party 114 based on various capabilities, characteristics, and/or information provided by the client device (e.g., PC or mobile device) being used to interact with the third-party server 116 and/or third-party application 118. For example, the server-side web application implemented by the third party 114 may derive the location of the user from information provided by a web browser application, messaging application (e.g., e-mail, IM, SMS, MMS, telephone, voicemail, VoIP, video messaging), contacts application, calendar application, electronic document application, database application, media application (e.g., music, video, television), LBS application (e.g., GPS, mapping, directions, point-of-interest, locator), and/or other client application running on the client device of the user.

The server-side web application implemented by the third party 114 may be configured to generate a query based upon the location of a user and other event criteria. In various embodiments, the query may comprise the location of the user as well as time-based information (e.g., date or date range) for requesting location-based upcoming event information for one or more events for which tickets are available occurring on a certain date or within a particular date range. The server-side web application implemented by the third party 114 may generate the query using a default date (e.g., this week) and/or may prompt the user to enter a specified date or date range.

In some embodiments, the server-side web application implemented by the third party 114 may allow the user to request upcoming event information based on a variety of event criteria such as an event name, category, city, venue, artist, genre, team, player (e.g., starting pitcher, favorite player), theater, date range, date, number of tickets, price range, ticket attributes (e.g., zone range, zone, section range, section, row range, row, seat number range, seat number), and/or combination thereof. Accordingly, the event criteria included in the query may comprise ticket attributes as well as one or more conditions associated with the event parameters for requesting information for such upcoming events only when such conditions are met.

It can be appreciated that various combinations of event criteria are possible in accordance with the described embodiments. For example, a user may request upcoming event information specifying combinations such as a certain number of tickets and a maximum price, a particular artist and a certain city, a certain player and a particular event venue, and so forth. A user also may request upcoming event information based on one or more ticket attributes. For instance, a user may request a certain number of tickets for an upcoming event in one or more specified zones, sections, rows, and/or or seats. Additionally, event criteria may be applied alone or in combination across one or more events. A user may request, for example, tickets in a certain row (e.g., front row) or row range (e.g., rows 1-5) within a specified zone (e.g., club infield) or section (e.g., section 224) for a designated team (e.g., professional baseball team) and/or for one or more games (e.g., particular opponent, rivalry game). The embodiments are not limited in the regard.

Using the location of a user and other event criteria, the server-side web application implemented by the third party 114 may generate a query prior to communicating with network-based system 110. The server-side web application implemented by the third party 114 then may communicate the generated query to the network-based system 110 for requesting location-based upcoming event information for one or more upcoming events. For example, the server-side web application implemented by the third party 114 may communicate the generated query to the listing catalog server 138 of the network-based system 110. The query received by the listing catalog server 138 may comprise, for example, a search query, web query, web feed request (e.g., RSS feed request, ATOM feed request), API request, HTTP request, and/or suitable request mechanism in accordance with the described embodiments.

In accordance with various embodiments, the query may be generated based upon identifiers associated with the location and/or other event criteria as defined by the network-based system 110. As described above, in some embodiments, the events and ticket listings provided by the listing catalog server 138 may be associated with one or more high-level (e.g., top level) identifiers (e.g., genre id, geo id). In such embodiments, the identifiers (e.g., genre ids and/or geo ids) may be coded according to a proprietary scheme of the network-based system 110. In one example, the high-level genre id=1 for concerts, the high-level genre id=722 for PGA golf events, the high the high-level geo id=81 for 2008 MLB games, the high-level geo id=4 for California, and the high-level geo id=81 for SF Bay Area. To query for search results limited to a particular location and/or a particular genre (e.g., SF Bay AREA PGA golf events) requires a query for requesting event index documents that have a particular geo id (81) in their ancestorGeoIds field and/or a particular genre id (722) in their ancestorGenreIds field.

In various implementations, the server-side web application implemented by the third party 114 may be pre-programmed and/or otherwise configured to automatically generate queries using identifiers as defined by the network-based system 110. For example, the server-side web application implemented by the third party 114 may be configured to automatically map a location and/or other criteria of a user to the corresponding geography and/or genre identifiers defined by the network-based system 110.

The listing catalog server 138 may be arranged to receive and respond to the query with a response including the requested event information for the upcoming events. In some embodiments, the response provided by the listing catalog server 138 may include event information delivered via a web feed or other suitable delivery mechanism. While the event information may be received by the server-side web application implemented by the third party 114 via a request/response mechanism, it can be appreciated that alternatively and/or additionally, the listing catalog server 138 may periodically push event information to the server-side web application implemented by the third party 114 in some implementations.

Exemplary event information parameters that may be included in the response from the network-based system 110 are described below in the following table.

| Event Information Parameter Table | |
|---|---|
| Event Parameter | Details |
| act_primary | Home Team Mascot |
| act_secondary | Away Team Mascot |
| active_type | 1 = active event |
|  | 0 = inactive event |
| allowedtosell | 1 = general public allowed to sell tickets |
|  | 0 = generatl public not allowed to sell tickets |
| ancestorGenreIds | List of parent IDs, in order of hierarchy, identifying browsing path to reach the node |
| ancestorGeoIds | List of geography IDs, in order of hierarchy, identifying browsing path to reach the geography node |
| canceled | 1 = event has been canceled |
|  | 0 = event has not been canceled |
| channel | Name of the top level genre in the breadcrumb trail tied to the event |
| channelId | ID of the top level genre in the breadcrumb trail tied to the event |
| channelUrlPath | URL path for the top level genre in the breadcrumb trail tied to the event |
| channel_facet_str | ID and Name of the top level genre in the breadcrumb trail tied to the event |
| city | City of the event |
| date_last_modified | Time of last change to the event |
| description | Name of the event |
| eventDate_facet_str | Month and year of the event, numeric (yyyy-mm) and alpha (month, yyyy) |
| eventGeoDescription | Name of venue |
| event_date | Date and time of the event (GMT) |
| event_date_local | yyyy-mm-dd of the event |
| event_date_time | Date and local time of the event |
| event_id | Unique ID of the event |
| event_time_local | Local time of the event |
| genreUrlPath | URL path for the parent genre of the event |
| genre_parent | ID of the parent genre of the event |
| geoUrlPath | URL path for the venue of the event |
| geography_parent | ID of the parent geo of the venue |
| hide_event_date | 1 = event date hidden |
|  | 0 = event date not hidden |
| id | ID of the event |
| last_chance | Date and time to delist the event used in place of the actual event date due to shipping rules |
| maxPrice | Highest ticket price for the event |
| maxSeatsTogether | Maximum number of successive seats that can be purchased together |
| minPrice | Lowest ticket price for the event |
| name_primary | Event match-up using team mascots (e.g., Mets vs Braves) |
| name_secondary | Full name of the away team (e.g., New York Mets) |
| spark_event_flag | Event marked as a "hot" event |
| state | State of the event |
| totalPostings | Number of actual postings for the event |
| totalTickets | Actual number of tickets listed for the event |
| venue_config_id | Configuration of the venue for the event |

It can be appreciated that, in some implementations, not all of the event information parameters included in the table may be necessary to display location-based upcoming event information to the user. Accordingly, when all of the event information parameters are included in the response, the server-side web application implemented by the third party 114 may parse the response and extract only those event information parameters that are needed. Alternatively, the query and/or the response may be configured to request and respond with only those event information parameters necessary to display location-based upcoming event information. It also can be appreciated that the response may include different event information parameters and/or additional event information parameters than those described in the table.

The server-side web application implemented by the third party 114 may be configured to communicate a query in response to clicking a button and/or hyperlink or in response to another suitable user command. Alternatively or additionally, queries may be communicated whenever the user visits a web page hosted by the third party 114. Accordingly, the server-side web application implemented by the third party 114 may send a query to the network-based system 110 for requesting updated event information and may display new event information received via a subsequent response from the network-based system 110. For example, the server-side web application implemented by the third party 114 may update the event information to include additional upcoming events, to remove certain upcoming events, and/or or to reflect event details (e.g., number of available tickets, prices, etc.) that have changed.

In response to a query communicated to the network-based system 110, the server-side web application implemented by the third party 114 may receive location-based upcoming event information for one or more upcoming events. In some cases, the response may be limited to location-based event information for upcoming events occurring within a particular date range. For example, the response to the query may include location-based event information for one or more events for which tickets are available occurring within the next seven days.

The server-side web application implemented by the third party 114 may display the location-based upcoming event information to a user in various ways. In some implementations, the location-based upcoming event information may be displayed by the server-side web application implemented by the third party 114 as a listing of events that satisfy the event criteria and for which tickets are available. The listing of events may include details for each event such as the event name, the event venue, the event date, the number of ticket listings, a price range, and/or other event details in accordance with the described embodiments. By selecting an upcoming event from the event listings, the user may be presented with additional event details and/or may initiate a ticket purchase.

The server-side web application implemented by the third party 114 also may display location-based upcoming event information on a map presented to the user. For example, the server-side web application implemented by the third party 114 may display a map that illustrates and/or pinpoints the locations of event venues and/or a ticket pick-up location such as an LMS center associated with the network-based system 110. By selecting a pinpointed location from the map, the user may be presented with details about events occurring at the selected location and/or with directions to the selected location.

In various embodiments, the upcoming event information returned in a query and displayed by the server-side web application implemented by the third party 114 may comprise ticket level details including section, row, and seat. Accordingly, users may be presented with specific ticket details by the server-side web application implemented by the third party 114 via a mapping user interface may view tickets, select tickets, and also set preferences at the ticket level based on ticket level details.

In one or more embodiments, the server-side web application implemented by the third party 114 may display location-based upcoming event information that includes event listings published by sellers via the online marketplace services of the network-based system 110 as well as event listings published by sellers via other online marketplace systems 112 (e.g., eBay® online marketplace, Kijiji™ online marketplace). In such embodiments, the server-side web application implemented by the third party 114 may display an aggregate of ticket inventory available from multiple online marketplaces providing the user with multiple purchasing options. In some implementations, the network-based system 110 may store event listings associated with other online marketplace systems 112 and may provide such event listings in response to a query from the server-side web application implemented by the third party 114. In other implementations, the network-based system 110 may retrieve event listings from other online marketplace systems 112 in response to a query from the server-side web application implemented by the third party 114 and then provide such event listings to the server-side web application implemented by the third party 114. Alternatively or additionally, the server-side web application implemented by the third party 114 may be configured to generate one or more queries to other online marketplace systems 112, and the other online marketplace systems 112 may be configured to respond to the server-side web application implemented by the third party 114 by providing the requested location-based upcoming event information.

In various embodiments, the server-side web application implemented by the third party 114 may access and receive dynamic content such as dynamic event information as well as relevant or related dynamic content. The dynamic content may be provided, for example, by one or more dynamic content campaigns linked to one or more of the identifiers associated with the location and/or other event criteria as defined by the network-based system 110. The dynamic event information may comprise, for example, event information that changes as new event listings for upcoming events are added and as event listings are removed when the tickets for such events listings are purchased and real-time event-specific information such as current event listings, price ranges, and true levels of ticket inventory. Relevant or related dynamic content received by the server-side web application implemented by the third party 114 may comprise, for example, dynamic content customized according to the location of the user such as location-based advertising content (e.g., banner ads), relevant and/or related categories and subcategories (e.g., links for local sports teams, artists performing in the location, theater shows playing in the location), a list of event names and dates for upcoming events in the location arranged by category, and/or other type of dynamic featured content that changes according to the location of the user.

In some implementations, the appearance of a user interface displayed by the server-side web application implemented by the third party 114 may be customized or branded with dynamic content based on the location of the user and/or event criteria specified by the user. For example, the server-side web application implemented by the third party 114 may display a user interface comprising a header, skin, or other designated area that dynamically displays different graphics (e.g., pictures, logos, backgrounds, etc.), advertisements, news, and/or other featured content received from the network-based system 110 according to the location and/or event criteria of the user.

To effectuate a ticket purchase, the server-side web application implemented by the third party 114 may display a user interface that prompts the user to log in by entering account information such as a unique username or e-mail address and a password. Upon receiving the required account information, the server-side web application implemented by the third party 114 may authenticate the user with the network-based system 110 and may allow the user to initiate and/or complete a ticket purchase via the server-side web application implemented by the third party 114. After authentication, the server-side web application implemented by the third party 114 may be configured to request and receive a source of financial value linked to the subscriber account of the user or may request the user to supply payment information (e.g., credit card account, PayPal™ account, etc.) for the transaction. Alternatively or additionally, when the user selects an upcoming event from the event listings displayed by the server-side web application implemented by the third party 114, a web page of the network-based system 110 may be launched by a web browser on the device of the user for allowing the user to log in and complete a ticket purchase.

In various embodiments, after supplying the account information required for authentication, the user also may access and receive various account services provided by the network-based system 110 via the server-side web application implemented by the third party 114. For example, the server-side web application implemented by the third party 114 may provide a seller with details regarding past and pending ticket sale listings (e.g., shipped, canceled, inactive, expired, deleted, active, pending confirmation, awaiting shipment) and may allow the user to track event listings, modify the prices of event listings, view and confirm received orders, view and confirm orders to ship, print or reprint shipping labels, view shipped orders, view canceled orders, view the status of payments and edit payment options, view past payments, and so forth.

The server-side web application implemented by the third party 114 also may provide a buyer with details regarding past and pending ticket purchase transactions (e.g., past orders, purchased, delivered, canceled, expired, order status, delivery status, active bids, auctions lost) and may allow the user to view order history, track active bids, modify offers, download and print electronic tickets, view and edit payment options, and so forth. In some implementations, the server-side web application implemented by the third party 114 may be customized with user preferences (e.g., interests, ticketing preferences, notification preferences) associated with the subscriber account and vice versa. For example, user preferences may be synchronized between the subscriber account of the user and the server-side web application implemented by the third party 114.

As described above, a buyer may purchase and use an electronic ticket at an event venue. In various embodiments, the server-side web application implemented by the third party 114 may allow a user to purchase electronic tickets. The server-side web application implemented by the third party 114 also may allow a user to save electronic ticket information. For example, the server-side web application implemented by the third party 114 may allow a user save an electronic ticket and/or a hyperlink to a file associated with the electronic ticket within a web widget. The user also may display information for and differentiate among purchased electronic tickets via the server-side web application implemented by the third party 114.

It can be appreciated that in some cases, an upcoming event may not satisfy all event criteria specified by the user. For example, tickets for an upcoming event may be available but not within a price range specified by the user. Additionally, there may be no upcoming events that satisfy the event criteria specified by the user when there are no available tickets such as when no sellers have listed tickets for an event and/or before tickets for an event go on sale. In such cases, the server-side web application implemented by the third party 114 may inform the user that there are no search results satisfying the search criteria and then perform a new search with relaxed search criteria. Alternatively or additionally, the server-side web application implemented by the third party 114 may automatically relax the search criteria and attempt another search.

In some implementations, when there are no upcoming events that satisfy all the event criteria specified by the user, the server-side web application implemented by the third party 114 may allow the user to select to receive alert notifications for one or more upcoming events conditioned on the complete satisfaction of the event criteria. For example, the server-side web application implemented by the third party 114 may provide the search criteria specified by the user to the network-based system 110 and allow the user to select to receive an alert notification whenever an upcoming event that substantially and/or completely satisfies the search criteria is listed. For example, the user may receive "on sale" alert notifications when tickets that satisfy one or more preferences of the user become available. In such implementations, the network-based system 110 may provide the user with various capabilities (e.g., preference settings and options) to allow the user to receive "on sale" alert notifications for preferred tickets and to allow the user to automatically and/or optionally purchase such preferred tickets.

In accordance with various embodiments, a server-side web application implemented by the third party 114 may provide one or more user interfaces to be presented to a user on the display of a client device (e.g., PC or mobile device) to present information to and/or receive information from the user. The user interfaces provided by the server-side web application implemented by the third party 114 may comprise a search engine interface (e.g., text entry boxes, input fields, checkboxes, clickable hyperlinks, pull-down menus, etc.) for allowing the user to provide a location and/or other event criteria for searching and/or filtering event listings. The user interfaces provided by the server-side web application implemented by the third party 114 also may comprise search results including location-based upcoming event listings that satisfy the location and/or other event criteria.

Exemplary representations of user interfaces displayed on a computer for presenting a user with location-based upcoming event information are described below with reference to FIGS. 2 and 3. It is to be understood that the embodiments are not limited to such exemplary representations. Furthermore, it is to be understood that while a particular user interface may be described as comprising a certain set of features and functions, a user interface may comprise fewer features and functions, additional features and functions, and/or a combination of various features and functions of different user interfaces in accordance with the described embodiments.

Figure 2:
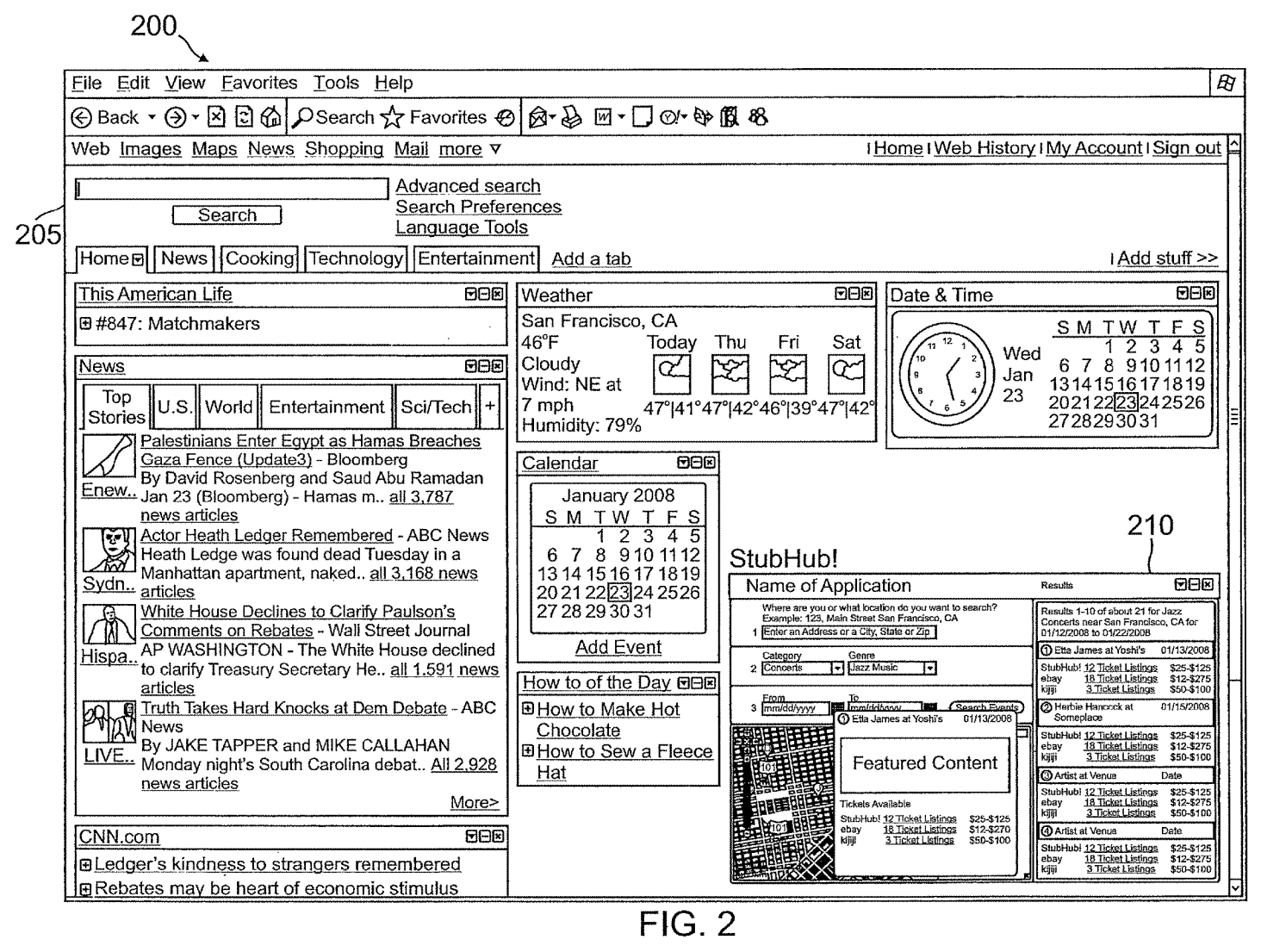

FIG. 2 illustrates a representation of user interface 200 presenting a third-party web page 205 comprising a server-side web application user interface 210 for accessing the network-based system 110 and providing location-based upcoming event information in accordance with various embodiments. With reference to FIG. 1, the third-party web page 205 may be hosted by the third party 114, and the server-side web application user interface 210 may be provided by a server-side web application implemented by the third party 114 via the third-party server 116 and/or the third-party application 118.

The third-party web page 205 including the server-side web application user interface 210 may be presented to a user by one or more client programs 106 (e.g., web browser) on one or more client devices 104 (e.g., PC or mobile device). When presented to a user, the server-side web application user interface 210 may allow the user to access and receive content and/or online services from the network-based system 110 via the third-party web page 205 hosted by the third party 114.

It can be appreciated that the embodiments are not limited to this context or to this representation and that the third-party web page 205 may comprise other types of web pages and/or may form part of any type of affiliate web site, partner web site, online marketplace web site, entertainment web site, sports web site, media web site, search engine web site, social networking web site, blog, and/or other corporate or personal web site in accordance with the described embodiments.

FIG. 3 illustrates a representation of the server-side web application user interface 210 for accessing the network-based system 110 and providing location-based upcoming event information in greater detail. As shown, the server-side web application user interface 210 comprises a search engine interface including a location field 212 to allow a user to enter a location (e.g., current location, desired location) used to search for location-based upcoming event information. The server-side web application user interface 210 also comprises a Category pull-down menu 214 and a Genre pull-down menu 216 for specifying event criteria to limit the search. The server-side web application user interface 210 also includes a "From" date field 218 and a "To" date field 220 for searching for location-based upcoming event information within a particular date range. It can be appreciated that the server-side web application user interface 210 is an exemplary embodiment and that a user interface provided by the server-side web application may allow the user to specify various types of event criteria in other embodiments.

The server-side web application user interface 210 also comprises a Search Events button 222 for generating a query and conducting a search and a results pane 224 for displaying the search results received in response to the query. In this example, the results pane 224 displays location-based upcoming event information as a listing of upcoming events having available tickets that are within the date range and that satisfy the event criteria (e.g., Category=Concerts, Genre=Jazz Music). As shown, the listing of events includes details for each event such as the event name, the event venue, the event date, the number of ticket listings, and a price range. The listing of events displayed in the results pane 224 also comprises an aggregate of ticket inventory from several seller platforms (e.g., StubHub, eBay, and Kijiji) giving the user multiple purchasing options. For instance, by selecting an upcoming event from the listing of events, the user may be presented with additional event details and/or may initiate a ticket purchase.

As shown, the server-side web application user interface 210 that is provided by the server-side web application also comprises a map 226. In this example, the map 226 includes a pin 228 illustrating the location of an event venue. Upon the selection of the pin 228, the server-side web application user interface 210 may display a pop-up window 230 including event details for the event venue comprising an aggregate of ticket inventory from several seller platforms (e.g., StubHub, eBay, and Kijiji) which can be selected by the user to initiate a ticket purchase. The pop-up window 230 also includes a featured content area which may comprise dynamic content that is relevant or related to the location and/or event criteria of the user.

Figure 4:
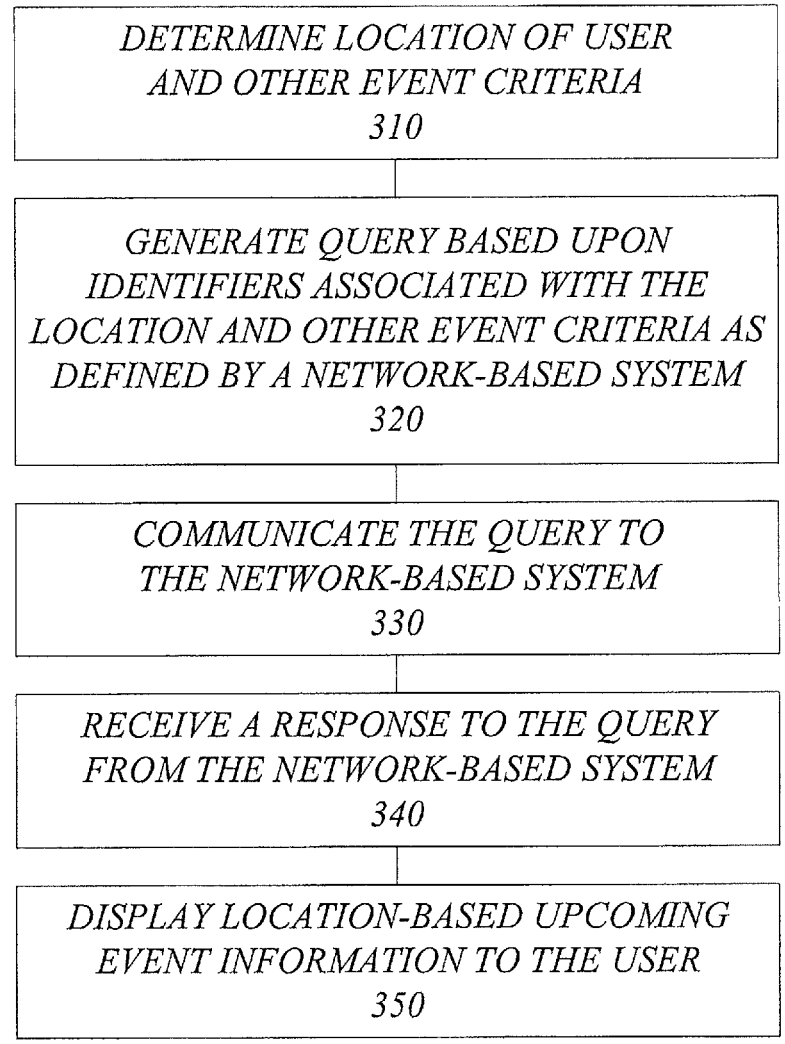
FIG. 4 illustrates a logic flow including operations performed by a computer for accessing the network-based system and providing location-based upcoming event information in accordance with various embodiments.

FIG. 4 illustrates a logic flow 300 including operations performed by a computer executing a server-side web application implemented by a third party to access a network-based system and provide location-based upcoming event information in accordance with the described embodiments. The logic flow 300 may be performed by various systems and/or devices and may be implemented as hardware, software, firmware, and/or any combination thereof, as desired for a given set of design parameters or performance constraints. For example, the logic flow 300 may be implemented by a logic device (e.g., computer and/or processor) and/or logic (e.g., computer executable program instructions) to be executed by a logic device.

As shown, the logic flow 300 may comprise logic and/or operations to determine a location of a user and other event criteria (block 310), generate a query based upon identifiers associated with the location and other event criteria as defined by a network-based system (block 320), communicating the query to the network-based system (block 330), receive a response to the query from the network-based system (block 340), and display location-based upcoming event information to the user (block 350). It can be appreciated that while the logic flow 300 may illustrate a certain sequence of logic and/or steps, other sequences of logic and/or steps may also be performed in accordance with the described embodiments. Moreover, some individual steps of the logic flow 300 may include multiple sub-steps that may be performed in various sequences as appropriate to the individual step. Furthermore, additional steps may be added or some steps may be removed depending on the particular implementation.

In various embodiments, one or more operations of the logic flow 300 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable programming language in accordance with the described embodiments.

In various embodiments, one or more operations of the logic flow 300 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Although some embodiments may be illustrated and described as comprising exemplary functional components or modules performing various operations, it can be appreciated that such components or modules may be implemented by one or more hardware components, software components, firmware components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer system comprising:
a non-transitory memory; and
one or more hardware processors coupled to the non-transitory memory and configured to read instructions from the non-transitory memory to cause the computer system to perform operations comprising:
determining a location of a user device associated with a user;
determining an event based on an event query comprising a first search criterion related to the determined location and a second search criterion related to an event type selected by the user;
aggregating, from different seller platforms, ticket information associated with a plurality of tickets for the event available for sale by the different seller platforms; and
causing to be displayed on the user device an interface comprising a first node presenting an interactive seat map of a venue for the event based on the aggregated ticket information that includes tickets available for sale by at least two of the different seller platforms, a second node presenting event-related content based on the first search criterion, and a third node presenting event-related content based on the second search criterion,
wherein the interactive seat map comprises graphical elements representing seat locations associated with the plurality of tickets, wherein each graphical element is interactive, and wherein when a graphical element is activated by a user interaction via the interface, price information and a name of a seller platform offering the associated ticket are displayed on the interface, and
wherein the second node further presents at least one of advertisement content or news based on the determined location, and wherein the third node further presents at least one of advertisement content or news based on the event type.

2. The computer system of claim 1, wherein the price information and the name of the seller platform are displayed in a pop-up window over the interactive seat map.

3. The computer system of claim 1, wherein sections on the interactive seat map for which tickets are not available for sale are displayed in a first color and wherein sections on the interactive seat map for which tickets are available for sale by at least one of the different seller platforms are displayed in a second color different from the first color.

4. The computer system of claim 3, wherein sections for which tickets are available for sale by at least one of the different seller platforms and that are located within a first distance of each other are displayed in a same color and wherein sections for which tickets are available for sale by at least one of the different seller platforms and that are separated by at least the first distance are displayed in a different color.

5. The computer system of claim 1, wherein the second node presents event information customized for the determined location and the third node presents event information customized for the selected event type, and wherein the first, second, and third nodes are presented simultaneously in the interface.

6. The computer system of claim 1, wherein the operations further comprise in response to detecting that a first graphical element is activated, removing from display information of tickets not associated with a section containing a seat location corresponding to the first graphical element.

7. A method comprising:
determining, by one or more hardware processors, a location of a user device associated with a user;
determining, by the one or more hardware processors, an event based on an event query comprising a first search criterion related to the determined location and a second search criterion related to an event type selected by the user;

aggregating, from different seller platforms, ticket information associated with a plurality of tickets for the event available for sale by the from different seller platforms; and causing to be displayed on the user device an interface comprising a first node presenting an interactive seat map of a venue for the event based on the aggregated ticket information that includes tickets available for sale by at least two of the different seller platforms, a second node presenting event-related content based on the first search criterion, and a third node presenting event-related content based on the second search criterion, wherein the interactive seat map comprises graphical elements representing seat locations associated with the plurality of tickets, wherein each graphical element is interactive, and wherein when a graphical element is activated by a user interaction via the interface, price information and a name of a seller platform offering the associated ticket are displayed on the interface, and wherein the second node further presents at least one of advertisement content or news based on the determined location, and wherein the third node further presents at least one of advertisement content or news based on the event type.

8. The method of claim 7, wherein the price information and the name of the seller platform are displayed in a pop-up window over the interactive seat map.

9. The method of claim 7, wherein sections on the interactive seat map for which tickets are not available for sale are displayed in a first color and wherein sections on the interactive seat map for which tickets are available for sale by at least one of the different seller platforms are displayed in a second color different from the first color.

10. The method of claim 9, wherein sections for which tickets are available for sale by at least one of the different seller platforms and that are located within a first distance of each other are displayed in a same color and wherein sections for which tickets are available for sale by at least one of the different seller platforms and that are separated by at least the first distance are displayed in a different color.

11. The method of claim 7, wherein the second node presents event information customized for the determined location and the third node presents event information customized for the selected event type, and wherein the first, second, and third nodes are presented simultaneously in the interface.

12. The method of claim 7, further comprising in response to detecting that a first graphical element is activated, removing from display information of tickets not associated with a section containing a seat location corresponding to the first graphical element.

13. A non-transitory machine-readable medium having stored thereon machine-readable instructions executable to cause a machine to perform operations comprising:

determining a location of a user device associated with a user;

determining an event based on an event query comprising a first search criterion related to the determined location and a second search criterion related to an event type selected by the user;

aggregating, from different seller platforms, ticket information associated with a plurality of tickets for the event available for sale by the different seller platforms;

and causing to be displayed on the user device an interface comprising a first node presenting an interactive seat map of a venue for the event based on the aggregated ticket information that includes tickets available for sale by at least two of the different seller platforms, a second node presenting event-related content based on the first search criterion, and a third node presenting event-related content based on the second search criterion, wherein the interactive seat map comprises graphical elements representing seat locations associated with the plurality of tickets, wherein each graphical element is interactive, and wherein when a graphical element is activated by a user interaction via the interface, price information and a name of a seller platform offering the associated ticket are displayed on the interface, and wherein the second node further presents at least one of advertisement content or news based on the determined location, and wherein the third node further presents at least one of advertisement content or news based on the event type.

14. The non-transitory machine-readable medium of claim 13, wherein the price information and the name of the seller platform is displayed in a pop-up window over the interactive seat map.

15. The non-transitory machine-readable medium of claim 13, wherein sections on the interactive seat map for which tickets are not available for sale are displayed in a first color and wherein sections on the interactive seat map for which tickets are available for sale by at least one of the different seller platforms are displayed in second color different from the first color.

16. The non-transitory machine-readable medium of claim 15, wherein sections for which tickets are available for sale by at least one of the different seller platforms and that are located within a first distance of each other are displayed in a same color and wherein sections for which tickets are available for sale by at least one of the different seller platforms and that are separated by at least the first distance are displayed in a different color.

17. The non-transitory machine-readable medium of claim 13, wherein the second node presents event information customized for the determined location and the third node presents event information customized for the selected event type, and wherein the first, second, and third nodes are presented simultaneously in the interface.

* * * * *

UNITED STATES PATENT AND TRADEMARK OFFICE
CERTIFICATE OF CORRECTION

PATENT NO. : 9,953,275 B2
APPLICATION NO. : 15/130857
DATED : April 24, 2018
INVENTOR(S) : Ashley Gibson, Cass Patrick Costello and Conny C. Wu Page 1 of 1

It is certified that error appears in the above-identified patent and that said Letters Patent is hereby corrected as shown below:

On the Title Page

Item (63) in the Related U.S. Application Data, on page 2, change "which is a continuation of application No. 11/552,782, filed on October 25, 2016, now Pat. No. 7,917,398" to --and is a continuation of application No. 11/552,782, filed on October 25, 2016, now Pat. No. 7,917,398--.

Signed and Sealed this
Twenty-sixth Day of June, 2018

Andrei Iancu
*Director of the United States Patent and Trademark Office*